(12) United States Patent
Muto et al.

(10) Patent No.: US 10,961,936 B2
(45) Date of Patent: Mar. 30, 2021

(54) ABNORMALITY DETECTION SYSTEM OF EXHAUST GAS RECIRCULATION SYSTEM

(71) Applicant: TOYOTA JIDOSHA KABUSHIKI KAISHA, Toyota (JP)

(72) Inventors: Harufumi Muto, Miyoshi (JP); Yuki Ikejiri, Nishio (JP); Akihiro Katayama, Toyota (JP); Yosuke Hashimoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/840,667

(22) Filed: Apr. 6, 2020

(65) Prior Publication Data

US 2020/0378330 A1    Dec. 3, 2020

(30) Foreign Application Priority Data

Jun. 3, 2019  (JP) .............................. JP2019-103664

(51) Int. Cl.

| F02D 41/22 | (2006.01) |
|---|---|
| F02M 35/10 | (2006.01) |
| F02M 26/13 | (2016.01) |
| F02D 41/00 | (2006.01) |
| F02D 9/08 | (2006.01) |
| G06N 3/08 | (2006.01) |
| G06N 3/04 | (2006.01) |

(52) U.S. Cl.
CPC .............. *F02D 41/22* (2013.01); *F02D 9/08* (2013.01); *F02D 41/0052* (2013.01); *F02D 41/0077* (2013.01); *F02M 26/13* (2016.02); *F02M 35/10222* (2013.01); *G06N 3/04* (2013.01); *G06N 3/08* (2013.01); *F02D 2200/0406* (2013.01); *F02D 2200/0414* (2013.01); *F02D 2200/101* (2013.01); *F02D 2200/70* (2013.01)

(58) Field of Classification Search
CPC ........ F02D 41/22; F02D 41/0077; F02D 9/08; F02D 41/0052; F02D 2200/70; F02D 2200/101; F02D 2200/0406; F02D 2200/0414; F02M 35/10222; F02M 26/13; G06N 3/08; G06N 3/04
See application file for complete search history.

(56) References Cited

U.S. PATENT DOCUMENTS

| 5,257,610 A | 11/1993 | Ohuchi | |
|---|---|---|---|
| 2010/0089371 A1* | 4/2010 | Shibata | F02D 41/221 123/568.16 |
| 2014/0144219 A1* | 5/2014 | Narita | F02D 41/0072 73/114.74 |

FOREIGN PATENT DOCUMENTS

JP    5-1624 A    1/1993

* cited by examiner

*Primary Examiner* — Xiao En Mo
(74) *Attorney, Agent, or Firm* — Oblon, McClelland, Maier & Neustadt, L.L.P.

(57) ABSTRACT

A learned neural network in weights using at least the four parameters of the engine load, engine speed, intake pressure inside the intake passage downstream of the throttle valve (12), and amount of intake air fed into the engine as input parameters of the neural network and using a target EGR rate as training data is stored. At the time of engine operation, the learned neural network is used to estimate the target EGR rate from the above parameters and abnormality of the exhaust gas recirculation system is detected based on the difference between the estimated value of the target EGR rate and the target EGR rate.

7 Claims, 25 Drawing Sheets

FIG. 10

| | INPUT PARAMETERS | |
|---|---|---|
| ESSENTIAL | ENGINE LOAD | $(x_1)$ |
| | ENGINE SPEED | $(x_2)$ |
| | INTAKE PRESSURE | $(x_3)$ |
| | INTAKE AIR AMOUNT | $(x_4)$ |
| AUXILIARY | ATMOSPHERIC PRESSURE | $(x_5)$ |
| | INTAKE TEMPERATURE | $(x_6)$ |
| | ENGINE COOLING WATER TEMPERATURE | $(x_7)$ |

FIG. 11

| No. | $x_1$ | $x_2$ | ............ | $x_{n-1}$ | $x_n$ | $y_t$ |
|---|---|---|---|---|---|---|
| 1 | $x_{11}$ | $x_{21}$ | ............ | $x_{n-11}$ | $x_{n1}$ | $y_{t1}$ |
| 2 | $x_{12}$ | $x_{22}$ | ............ | $x_{n-12}$ | $x_{n2}$ | $y_{t2}$ |
| ⋮ | ⋮ | ⋮ | ⋮ | ⋮ | ⋮ | ⋮ |
| m−1 | $x_{1m-1}$ | $x_{2m-1}$ | ............ | $x_{n-1m-1}$ | $x_{nm-1}$ | $y_{tm-1}$ |
| m | $x_{1m}$ | $x_{2m}$ | ............ | $x_{n-1m}$ | $x_{nm}$ | $y_{tm}$ |

# ABNORMALITY DETECTION SYSTEM OF EXHAUST GAS RECIRCULATION SYSTEM

FIELD

The present invention relates to an abnormality detection system of an exhaust gas recirculation system.

BACKGROUND

In an internal combustion engine provided with an exhaust gas recirculation (hereinafter referred to as "EGR") passage for making exhaust gas discharged from the engine recirculate to an intake manifold downstream of a throttle valve and placing an EGR valve inside this EGR passage, if the EGR valve opens, high pressure exhaust gas is recirculated to the inside of the intake manifold, so the pressure of the intake manifold rises compared with when the EGR valve is made to closed. Therefore, it is possible to judge if the EGR valve is operating normally from the change in pressure inside the intake manifold when the EGR valve is open and when the EGR valve is closed.

Therefore, known in the art is an abnormality detection system for an exhaust gas recirculation system designed to make the EGR valve forcibly close for a certain time at the time of engine medium load and medium speed operation in which the engine load and the engine speed are within respectively predetermined ranges and the EGR valve is open and to judge if the EGR valve is operating normally from the change in pressure in the intake manifold at that time (for example, see Japanese Unexamined Patent Publication No. 5-001624).

SUMMARY

However, even if the engine load and the engine speed are within respectively determined ranges, if the engine load and the engine speed differ, the pressure inside the intake manifold will greatly change. Therefore, even if, like in the above-mentioned abnormality detection system of an exhaust gas recirculation system, forcibly making the EGR valve close for a certain time at the time of engine medium load and medium speed operation in which the engine load and the engine speed are within respectively preset ranges and judging if the EGR valve is operating normally from the change in pressure inside the intake manifold at that time, it is difficult to accurately judge if the EGR valve is operating normally.

Therefore, according to the present invention, there is provided an abnormality detection system of an exhaust gas recirculation system comprising
 an EGR passage for making exhaust gas discharged from an engine recirculate to an intake passage downstream of a throttle value, and
 an EGR valve arranged in the EGR passage, a target EGR rate being stored in advance as a function of at least an engine load and an engine speed, an opening degree of the EGR valve being controlled so that an EGR rate becomes the target EGR rate, wherein,
 a learned neural network in weights using at least four parameters of an engine load, an engine speed, an intake pressure inside the intake passage downstream of the throttle valve, and an amount of intake air fed into the engine as input parameters of the neural network and using the target EGR rate as training data is stored
 the target EGR rate is estimated from the input parameters using the learned neural network at the time of an engine operation, and
 an abnormality of the exhaust gas recirculation system is detected based on the difference between an estimated value of the target EGR rate and the target EGR rate.

According to the present invention, by using the learned neural network to estimate the target EGR rate and detecting an abnormality of an exhaust gas recirculation system based on the difference between the estimated value of the target EGR rate and the target EGR rate, it becomes possible to accurately detect an abnormality.

BRIEF DESCRIPTION OF DRAWINGS

FIG. 10 is a view showing a list of input parameters.

FIG. 11 is a view showing training data sets.

DESCRIPTION OF EMBODIMENTS

Overall Configuration of Internal Combustion Engine

Figure 1:
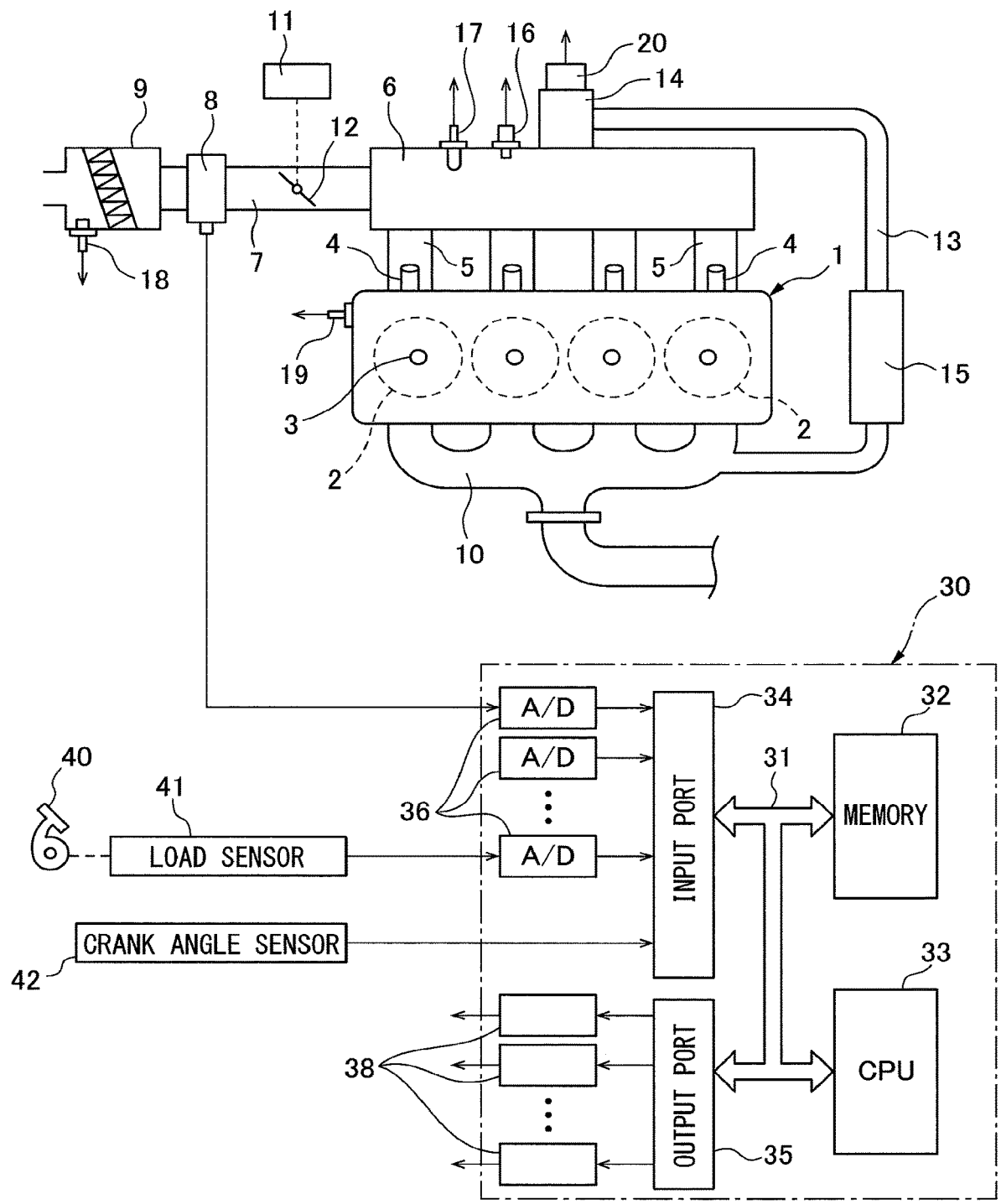
FIG. 1 is an overall view of an internal combustion engine.

FIG. 1 shows an overall view of an internal combustion engine provided with an exhaust gas recirculation system. If referring to FIG. 1, 1 indicates an engine body, 2 a combustion chamber for each cylinder, 3 a spark plug arranged inside each combustion chamber 1, 4 a fuel injector for supplying each combustion chamber 5 with fuel, for example, gasoline, 5 intake branch pipes, 6 a surge tank, 7 an intake duct, 8 an intake air amount detector, 9 an air cleaner, and 10 an exhaust manifold. Inside of the intake duct 7, a throttle valve 12 driven by an actuator 11 is arranged. On the other hand, the exhaust manifold 10 is connected to the surge tank 6 through an EGR passage 13 and an EGR valve 14. Inside of the EGR passage 13, an EGR cooler 15 for cooling the EGR gas is arranged. An exhaust gas recirculation system is configured by these EGR passage 13, EGR control valve 14, and EGR cooler 15.

As shown in FIG. 1, inside of the surge tank 6, an intake pressure sensor 16 for detecting a pressure inside of the surge tank 6, that is, an intake pressure, and an intake temperature sensor 17 for detecting a gas temperature inside of the surge tank 6, that is, an intake temperature, are attached. Further, inside of the air cleaner 9, an atmospheric pressure sensor 18 for detecting an atmospheric pressure is attached. In the engine body 1, a water temperature sensor 19 for detecting a temperature of the cooling water is attached. Further, an EGR valve opening degree sensor 20 for detecting an opening degree of the EGR valve 14 is attached to the EGR valve 14.

On the other hand, in FIG. 1, 30 shows an electronic control unit for controlling operation of the engine. As shown in FIG. 1, the electronic control unit 30 comprises a digital computer which is provided with a storage device 32, that is, a memory 32, a CPU (microprocessor) 33, input port 34, and output port 35, which are connected with each other by a bidirectional bus 31. At the input port 34, output signals of the intake air amount detector 8, intake pressure sensor 16, intake temperature sensor 17, atmospheric pressure sensor 18, water temperature sensor 19, and EGR valve opening degree sensor 20 are input through respectively corresponding AD converters 36.

Further, at an accelerator pedal 40, a load sensor 41 for generating an output voltage proportional to an amount of depression of the accelerator pedal 40 is connected. The output voltage of the load sensor 41 is input through the corresponding AD converter 36 to the input port 34. Further, at the input port 34, a crank angle sensor 42 generating an output pulse every time a crankshaft rotates by for example 30° is connected. Inside of the CPU 33, the engine speed is calculated based on an output signal of the crank angle sensor 42. On the other hand, the output port 35 is connected through corresponding drive circuits 38 to the spark plugs 3, fuel injectors 4, actuator 11 of the throttle valve 12, and EGR valve 14.

Now then, the EGR rate has a great effect on combustion in the combustion chamber 2, and the optimum EGR rate, basically, becomes a function of the engine load and the engine speed. Therefore, normally, the optimum EGR rate is stored in advance as a target EGR rate in the form of a function of at least the engine load and the engine speed. The EGR valve opening degree is controlled so that the EGR rate becomes the target EGR rate. In this case, if an abnormality occurs in the exhaust gas recirculation system and the EGR rate no longer matches the target EGR rate, various problems will arise. Therefore, if an abnormality occurs in the exhaust gas recirculation system, the fact that an abnormality occurs in the exhaust gas recirculation system has to be detected early.

In this regard, accurately judging if an abnormality occurs in the exhaust gas recirculation system from only the change of the intake pressure is considerably difficult. On the other hand, if an abnormality occurs in the exhaust gas recirculation system, the EGR rate will no longer match with the target EGR rate and a difference will occur between the EGR rate and the target EGR rate. Therefore, in the embodiment according to the present invention, a learned neural network is used to estimate the target EGR rate and whether or not an abnormality occurs in the exhaust gas recirculation system is accurately judged based on the difference between the estimated value of the target EGR rate and the target EGR rate.

Summary of Neural Network

Figure 2:
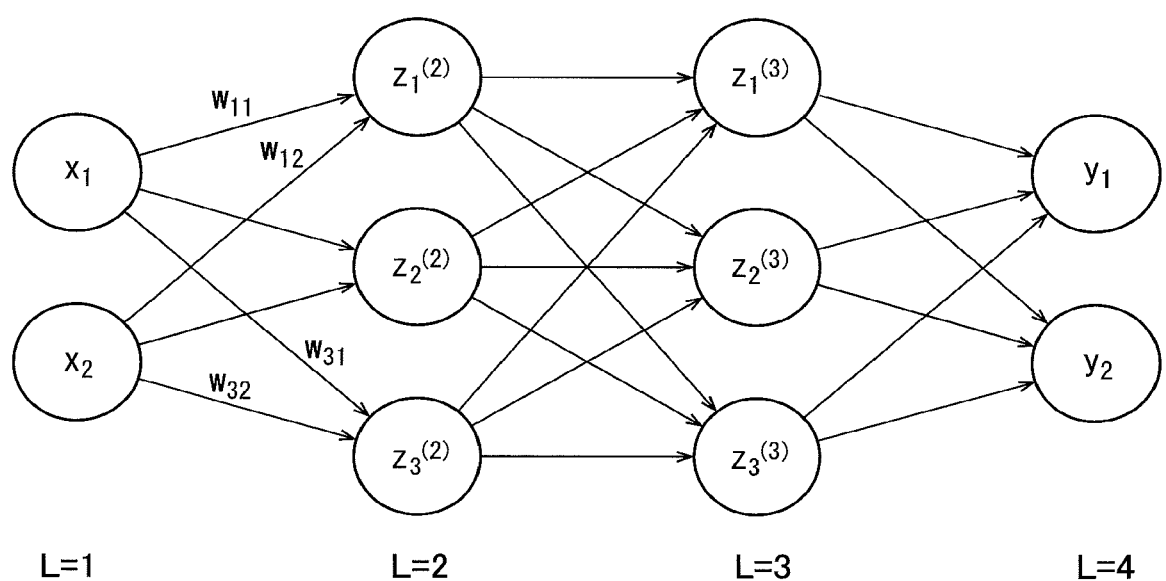
FIG. 2 is a view showing one example of a neural network.

As explained above, in the embodiment according to the present invention, a neural network is used to estimate the target EGR rate. Therefore, first, a neural network will be briefly explained. FIG. 2 shows a simple neural network. The circle marks in FIG. 2 show artificial neurons. In the neural network, these artificial neurons are usually called "nodes" or "units" (in the present application, they are called "nodes"). In FIG. 2, L=1 shows an input layer, L=2 and L=3 show hidden layers, and L=4 shows an output layer. Further, in FIG. 2, $x_1$ and $x_2$ show output values from nodes of the input layer (L=1), $y_1$ and $y_2$ show output values from the nodes of the output layer (L=4), $z^{(2)}_1$, $z^{(2)}_2$, and $z^{(2)}_3$ show output values from the nodes of one hidden layer (L=2), and $z^{(3)}_1$, $z^{(3)}_2$, and $z^{(3)}_3$ show output values from the nodes of another hidden layer (L=3). Note that, the numbers of hidden layers may be made one or any other numbers, while the number of nodes of the input layer and the numbers of nodes of the hidden layers may also be made any numbers. Further, the number of nodes of the output layer may be made a single node, but may also be made a plurality of nodes. In this case, in the embodiment according to the present invention, the number of nodes of the output layer is made one.

At the nodes of the input layer, the inputs are output as they are. On the other hand, the output values $x_1$ and $x_2$ of the nodes of the input layer are input at the nodes of the hidden layer (L=2), while the respectively corresponding weights "w" and biases "b" are used to calculate sum input values "u" at the nodes of the hidden layer (L=2). For example, a sum input value $u_k$ calculated at a node shown by $z^{(2)}_k$ (k=1, 2, 3) of the hidden layer (L=2) in FIG. 2 becomes as shown in the following equation:

$$U_k = \sum_{m=1}^{n}(x_m \cdot w_{km}) + b_k$$

Next, this sum input value $u_k$ is converted by an activation function "f" and is output from a node shown by $z^{(2)}_k$ of the hidden layer (L=2) as an output value $z^{(2)}_k$ (=$f(u_k)$). On the other hand, the nodes of the hidden layer (L=3) receive as input the output values $z^{(2)}_1$, $z^{(2)}_2$, and $z^{(2)}_3$ of the nodes of the hidden layer (L=2). At the nodes of the hidden layer (L=3), the respectively corresponding weights "w" and biases "b" are used to calculate the sum input values "u" ($\Sigma z \cdot w + b$). The sum input values "u" are similarly converted by an activation function and output from the nodes of the hidden layer (L=3) as the output values $z^{(3)}_1$, $z^{(3)}_2$, and $z^{(3)}_3$. As this activation function, for example, a Sigmoid function σ is used.

On the other hand, at the nodes of the output layer (L=4), the output values $z^{(3)}_1$, $z^{(3)}_2$, and $z^{(3)}_3$ of the nodes of the hidden layer (L=3) are input. At the nodes of the output layer, the respectively corresponding weights "w" and biases "b" are used to calculate the sum input values "u" (Σz·w+b) or just the respectively corresponding weights "w" are used to calculate the sum input values "u" (Σz·w). In the embodiment according to the present invention, at the nodes of the output layer, an identity function is used, therefore, from the nodes of the output layer, the sum input values "u" calculated at the nodes of the output layer are output as they are as the output values "y".

Learning in Neural Network

Now then, if designating the training data showing the truth values of the output values "y" of the neural network as $y_t$, the weights "w" and biases "b" in the neural network are learned using the error backpropagation algorithm so that the difference between the output values "y" and the training data $y_t$ becomes smaller. This error backpropagation algorithm is known. Therefore, the error backpropagation algorithm will be explained simply below in its outlines. Note that, a bias "b" is one kind of weight "w", so below, a bias "b" will be also be included in what is referred to as a weight "w". Now then, in the neural network such as shown in FIG. 2, if the weights at the input values $u^{(L)}$ to the nodes of the layers of L=2, L=3, or L=4 are expressed by $w^{(L)}$, the differential due to the weights $w^{(L)}$ of the error function E, that is, the slope $\partial E/\partial w^{(L)}$, can be rewritten as shown in the following equation:

$$\partial E/\partial w^{(L)} = (\partial E/\partial u^{(L)})(\partial u/\partial w^{(L)}) \tag{1}$$

where, $z^{(L-1)} \cdot \partial w^{(L)} = \partial u^{(L)}$, so if $(\partial E/\partial u^{(L)}) = \delta^{(L)}$, the above equation (1) can be shown by the following equation:

$$\partial E/\partial w^{(L)} = \delta^{(L)} \cdot z^{(L-1)} \tag{2}$$

where, if $u^{(L)}$ fluctuates, fluctuation of the error function E is caused through the change in the sum input value $u^{(L+1)}$ of the following layer, so $\delta^{(L)}$ can be expressed by the following equation:

$$\delta^{(L)} = \left(\frac{\partial E}{\partial u^{(L)}}\right) = \sum_{k=1}^{k}\left(\frac{\partial E}{\partial u_k^{(L+1)}}\right)\left(\frac{\partial u_k^{(L+1)}}{\partial u^{(L)}}\right)(k=1,2,\ldots) \tag{3}$$

where, if expressing $z^{(L)} = f(u^{(L)})$, the input value $u_k^{(L+1)}$ appearing at the right side of the above equation (3) can be expressed by the following formula:

$$\text{input value } u_k^{(L+1)} = \sum_{k=1}^{k} w_k^{(L+1)} \cdot z^{(L)} = \sum_{k=1}^{k} w_k^{(L+1)} \cdot f(u^{(L)}) \tag{4}$$

where, the first ten $(\partial E/\partial u^{(L+1)})$ at the right side of the above equation (3) is $\delta^{(L+1)}$, and the second term $(\partial u_k^{(L+1)}/\partial u^{(L)})$ at the right side of the above equation (3) can be expressed by the following equation:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \tag{5}$$

Therefore, $\delta^{(L)}$ is shown by the following formula.

$$\delta^{(L)} = \sum_{k=1}^{k} w_k^{(L+1)} \cdot \delta^{(L+1)} \cdot f'(u^{(L)})$$

That is, $$\delta^{(L-1)} = \sum_{k=1}^{k} w_k^{(L)} \cdot \delta^{(L)} \cdot f'(u^{(L-1)}) \tag{6}$$

That is, if $\delta^{(L+1)}$ is found, it is possible to find $\delta^{(L)}$.

Now then, when there is a single node of the output layer (L=4), training data $y_t$ is found for a certain input value, and the output values from the output layer corresponding to this input value are "y", if the square error is used as the error function, the square error E is found by $E = \frac{1}{2}(y-y_t)^2$. In this case, at the node of the output layer (L=4), the output values "y" become $f(u^{(L)})$, therefore, in this case, the value of $\delta^{(L)}$ at the node of the output layer (L=4) becomes like in the following equation:

$$\delta^{(L)} = \partial E/\partial u^{(L)} = (\partial E/\partial y)(\partial y/\partial u^{(L)}) = (y-y_t) \cdot f'(u^{(L)}) \tag{7}$$

In this case, in the embodiments of the present invention, as explained above, $f(u^{(L)})$ is an identity function and $f(u^{(L1)}) = 1$. Therefore, this leads to $\delta^{(L)} = y-y_t$ and $\delta^{(L)}$ is found.

If $\delta^{(L)}$ is found, the above equation (6) is used to find the $\delta^{(L-1)}$ of the previous layer. The $\delta$'s of the previous layer are successively found in this way. Using these values of $\delta$'s, from the above equation (2), the differential of the error function E, that is, the slope $\partial E/\partial w^{(L)}$, is found for the weights "w". If the slope $\partial E/\partial w^{(L)}$ is found, this slope $\partial E/\partial w^{(L)}$ is used to update the weights "w" so that the value of the error function E decreases. That is, the values of the weights "w" are learned. Note that, as shown in FIG. 2, when the output layer (L=4) has a plurality of nodes, if making the output values from the nodes $y_1, y_2, \ldots$ and making the corresponding training data $y_{t1}, y_{t2}, \ldots$, as the error function E, the following square sum error E is used:

$$\text{Square sum error } E = \frac{1}{2}\sum_{k=1}^{n}(y_k - y_{tk})^2 \tag{8}$$

("n" is number of nodes of output layer)

In this case as well, the values of $\delta^{(L)}$ at the nodes of the output layer (L=4) become $\delta^{(L)} = y - y_{tk}$ (k=1, 2 . . . n). From the values of these $\delta^{(L)}$, the above formula (6) is used to find the $\delta^{(L-1)}$ of the previous layers.

Embodiments According to Present Invention

Figure 3A:
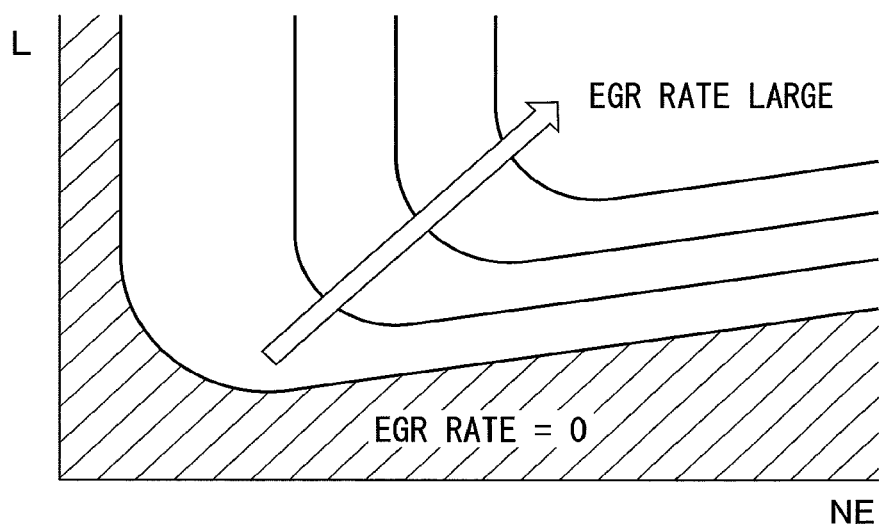
FIG. 3A and FIG. 3B are respectively views showing maps of optimal EGR rates and basic EGR rates.
Figure 3B:
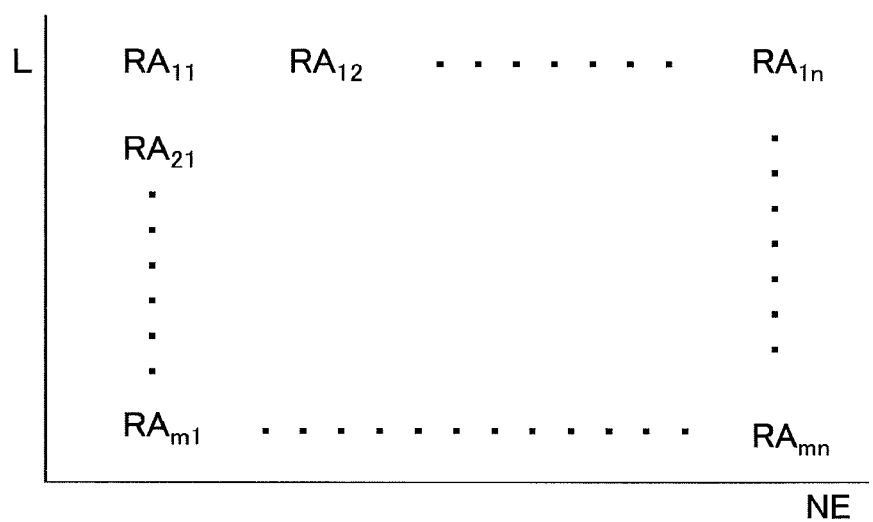

First, referring to FIG. 3A and FIG. 3B, the target EGR rate will be explained. As explained above, the optimal EGR rate is, basically, a function of the engine load and the engine speed. In FIG. 3A, this optimal EGR rate is shown in the form of a function of the engine load L and the engine speed NE. Note that, in FIG. 3A, the solid line shows the equivalent EGR rate curve. As shown in FIG. 3A by the arrow mark, the optimal EGR rate becomes higher the higher the engine load and becomes higher the higher the engine speed. This optimum EGR rate is stored in advance in the memory 32 as the basic EGR rate RA in the form of a map such as shown in FIG. 3B.

Figure 4:
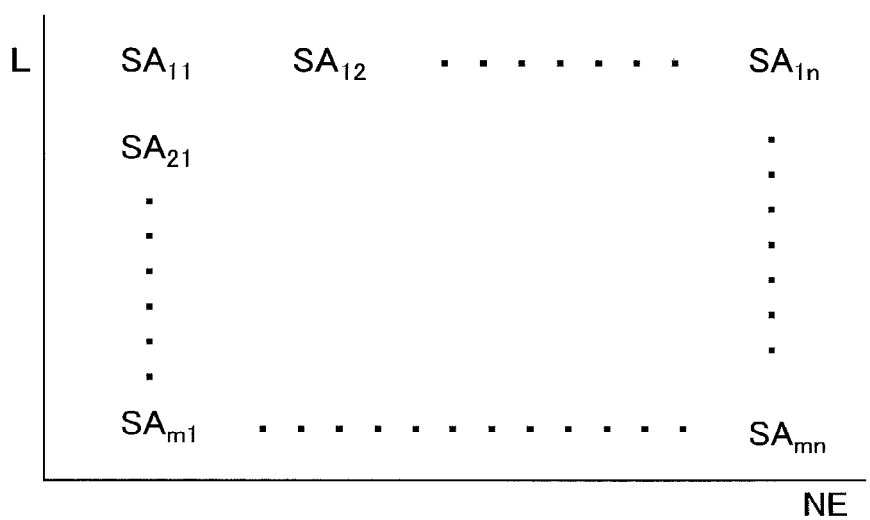
FIG. 4 is a view showing a map of an EGR valve target opening degree.
Figure 5A:
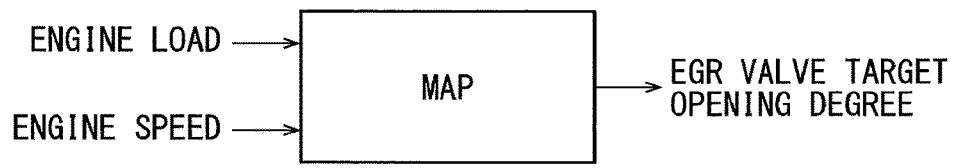
FIG. 5A and FIG. 5B are views of the functional configurations for finding the EGR valve target opening degree and estimated value of the EGR rate.

Next, the present invention will be explained, but first the present invention will be explained with reference to the example of the simplest constitution enabling the present invention to be worked. That is, in the present invention, the basic EGR rate RA shown in FIG. 3B is made the target EGR rate RAO while the EGR valve target opening degree SA required for making the EGR rate this target EGR rate RAO is found in advance. This EGR valve target opening degree SA is stored in advance in the memory 32 in the form of a map such as shown in FIG. 4 as a function of the engine load L and the engine speed NE. Furthermore, in the present invention, the opening degree of the EGR valve 14 is made the EGR valve target opening degree SA corresponding to the engine load L and the engine speed NE shown in FIG. 4. At this time, the EGR rate becomes the target EGR rate RA shown in FIG. 3B. FIG. 5A shows a view of the functional configuration in this case. That is, in the present invention, the EGR valve target opening degree SA is found in accordance with the engine load and the engine speed from the map shown in FIG. 4.

Now then, as explained above, if an abnormality occurs in the exhaust gas recirculation system and the EGR rate no longer matches the target EGR rate RA, various problems arise. Therefore, if an abnormality occurs in the exhaust gas recirculation system, the fact of the abnormality occurring in the exhaust gas recirculation system has to be detected early. In this case, for example, if the inside of the EGR valve 14 or the EGR passage 13 becomes clogged and a clogging abnormality is caused, even if the opening degree of the EGR valve 14 is constant, the amount of exhaust gas recirculated from the EGR passage 13 to the inside of the surge tank 6 will decrease and as a result the EGR rate will fall. Therefore, it is not possible to judge if the EGR rate falls from the change of the opening degree of the EGR valve 14.

As opposed to this, if the amount of exhaust gas recirculated from the EGR passage 13 to the inside of the surge tank 6 decreases, the pressure inside the surge tank 6 falls and the amount of intake air increases. That is, the pressure inside the surge tank 6 and the amount of intake air are greatly affected by the EGR rate. On the other hand, the target EGR rate RA is determined if the engine load L and the engine speed NE are determined Therefore, if the engine load L, engine speed NE, pressure inside the surge tank 6, and amount of intake air change, the EGR rate changes to an EGR rate corresponding to the engine load L, engine speed NE, pressure inside the surge tank 6, and amount of intake air. Therefore, in the present invention, as shown in the view of the functional configuration of FIG. 5B, the neural network is used to find the estimated value of the target EGR rate from the engine load L, engine speed NE, pressure inside the surge tank 6, and amount of intake air and any abnormality of the exhaust gas recirculation system is detected based on the difference between the estimated value of the target EGR rate and the target EGR rate.

Figure 5B:
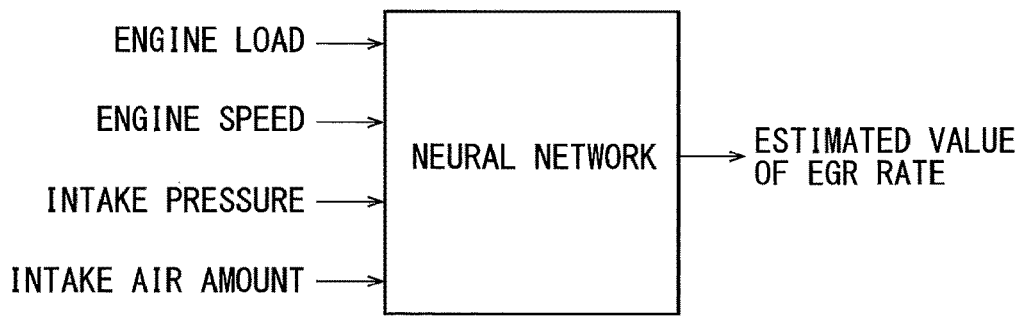

FIG. 5A and FIG. 5B show the simplest configuration able to work the present invention. Using this configuration, it is possible to detect any abnormality of the exhaust gas recirculation system. On the other hand, FIG. 6 to FIG. 8B show an embodiment in the case of setting the target EGR rate and EGR valve target opening degree SA a little bit finer. Below, the present invention will be explained with reference to the example of setting the target EGR rate and EGR valve target opening degree SA finely as shown in FIG. 6 to FIG. 8B.

Figure 6:
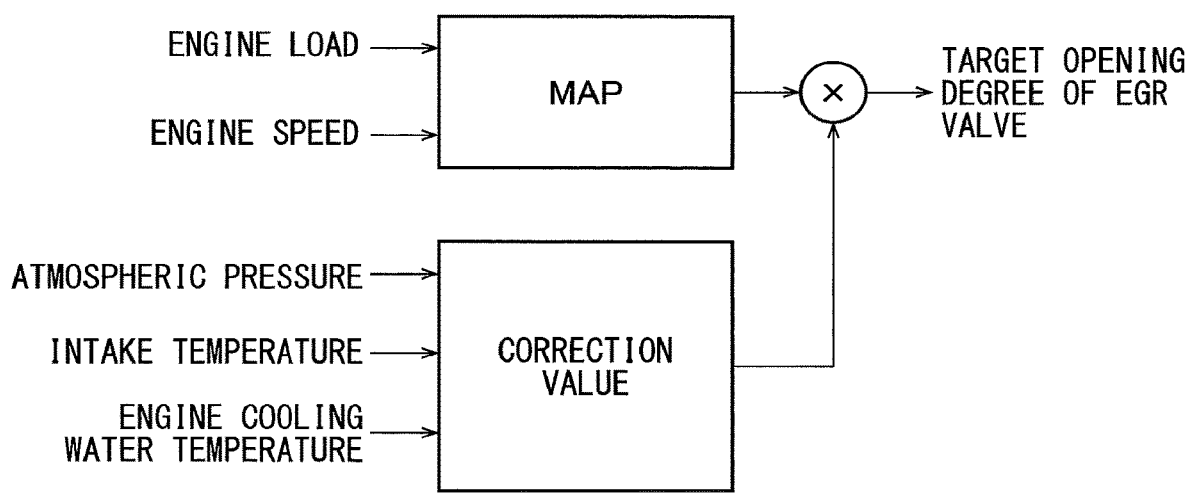
FIG. 6 is a view of the functional configuration for finding an EGR valve target opening degree.

Referring to FIG. 6, in this embodiment according to the present invention, the basic EGR rate RA calculated based on the engine load L and the engine speed NE from the map shown in FIG. 3B is corrected by the atmospheric pressure, intake temperature, and engine cooling water temperature while the EGR valve target opening degree SA calculated based on the engine load L and the engine speed NE from the map shown in FIG. 4 is corrected by the atmospheric pressure, intake temperature, and engine cooling water temperature. That is, in the embodiment according to the present invention, the basic EGR rate RA calculated based on the engine load L and the engine speed NE from the map shown in FIG. 3B is multiplied with a correction value calculated based on the atmospheric pressure, intake temperature, and engine cooling water temperature and the multiplied result is made the target EGR rate RAO. Furthermore, as shown in FIG. 6, the EGR valve target opening degree SA calculated based on the engine load L and the engine speed NE from the map shown in FIG. 4 is multiplied with a correction value calculated based on the atmospheric pressure, intake temperature, and engine cooling water temperature and the multiplied result is made the final EGR valve target opening degree SA.

Figure 7:
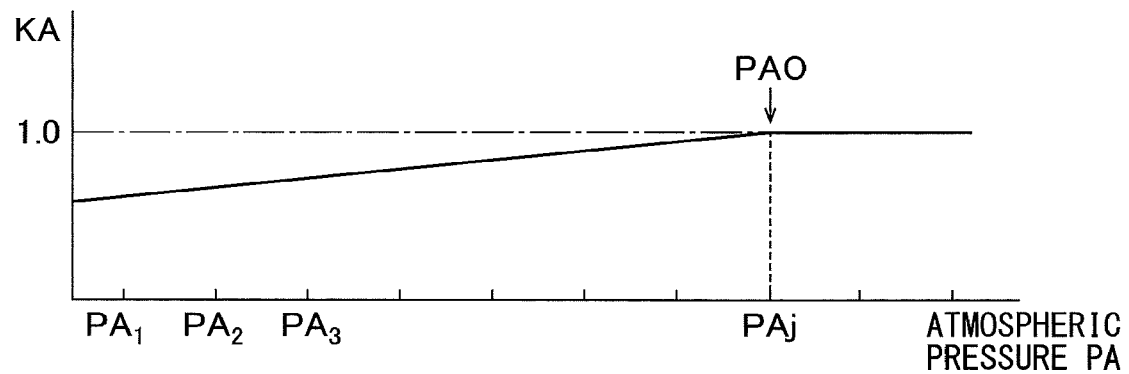
FIG. 7 is a view showing correction values KA, KB, and KC.
Figure 7:
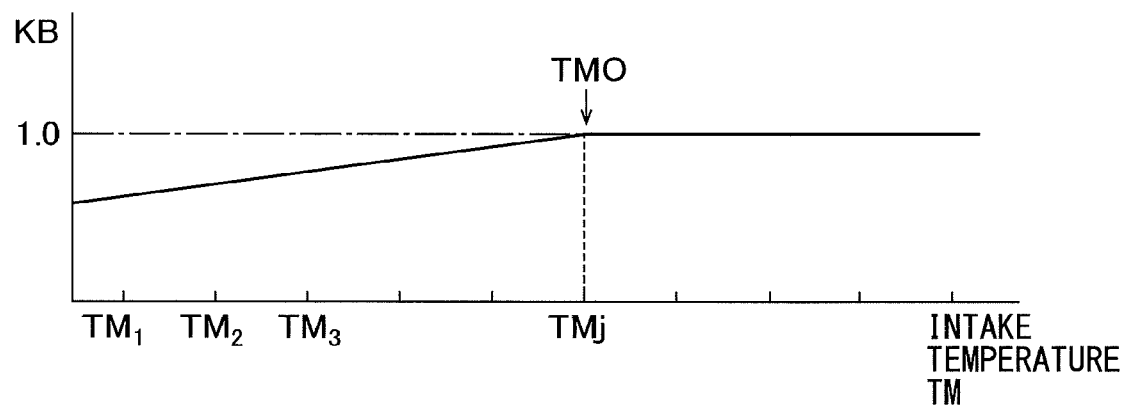
Figure 7:
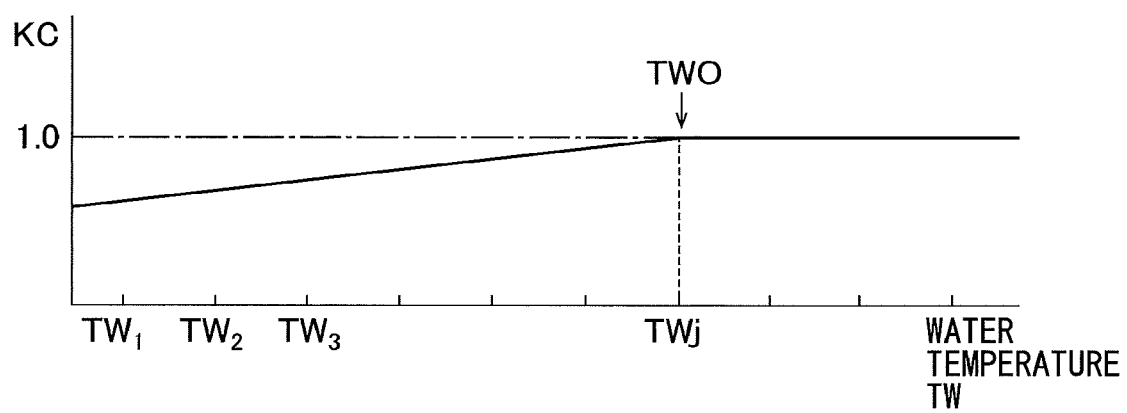

FIG. 7 shows an example of the correction value KA for the basic EGR rate RA according to the atmospheric pressure PA, the correction value KB for the basic EGR rate RA according to the intake temperature TM, and the correction value KC for the basic EGR rate RA according to the engine cooling water temperature TW. In the example shown in FIG. 7, the correction values KA, KB, and KC are set so that combustion does not deteriorate and misfires are not caused. That is, the lower the atmospheric pressure PA, the lower the concentration of oxygen in the intake air. Therefore, if the target EGR rate RA is maintained constant when the atmospheric pressure PA falls, the lower the atmospheric pressure PA, the more easily misfire will be caused. Therefore, to prevent misfire from occurring even if the atmospheric pressure PA becomes lower, as shown in FIG. 7, the lower the atmospheric pressure PA becomes, the lower the correction value KA is made. Note that, in FIG. 7, PAO shows the standard atmospheric pressure (0.1013 MPa). When the atmospheric pressure PA is the standard atmospheric pressure PAO or more, the correction value KA is made 1.0.

On the other hand, in FIG. 7, when the intake temperature TM is higher than even the reference temperature TMO (for example, 5° C.), no misfire occurs. Therefore, when the intake temperature TM is higher than the reference temperature TMO, the correction value KB is made 1.0. As opposed to this, when the intake temperature TM is lower than the reference temperature TMO, if the target EGR rate RA is maintained constant, the lower the intake temperature TM becomes, the easier it becomes for misfire to occur. Therefore, to prevent misfire from occurring even if the intake temperature TM becomes lower, as shown in FIG. 7, the lower the intake temperature TM, the lower the correction value KC is made.

On the other hand, in FIG. 7, when the engine cooling water temperature TW is higher than the reference temperature TWO (for example, 70° C.), no misfire occurs. Therefore, when the engine cooling water temperature TW is higher than the reference temperature TWO, the correction value KC is made 1.0. As opposed to this, when the engine cooling water temperature TW is lower than the reference temperature TWO, if the target EGR rate RA is maintained constant, the lower the engine cooling water temperature TW, the more easily misfire occurs. Therefore, to prevent misfire from occurring even if the engine cooling water temperature TW becomes low, as shown in FIG. 7, the lower the engine cooling water temperature TW, the lower the correction value KB is made.

The correction value KKRA for the basic EGR rate RA is expressed by the product of the correction value KA, correction value KB, and correction value KC (KA·KB·KC) shown in FIG. 7. Therefore, in the embodiment according to the present invention, the basic EGR rate RA calculated based on the engine load L and the engine speed NE from the map shown in FIG. 3B is multiplied with the correction value KKRA (=KA·KB·KC) calculated based on the atmospheric pressure, intake temperature, and engine cooling water temperature and the multiplied result is made the target EGR rate RAO. In this case, the correction value KKRA (=KA·KB·KC) is 1.0 or less. Therefore, the target EGR rate RAO becomes the basic EGR rate RA calculated based on the engine load L and the engine speed NE from the map shown in FIG. 3B or becomes less. Note that, misfire easily occurs when the engine load is low. Therefore, it is possible to multiply the correction value KKRA with only the basic EGR rate RA in a predetermined engine low load operating region where the engine load L is low.

Figure 8:
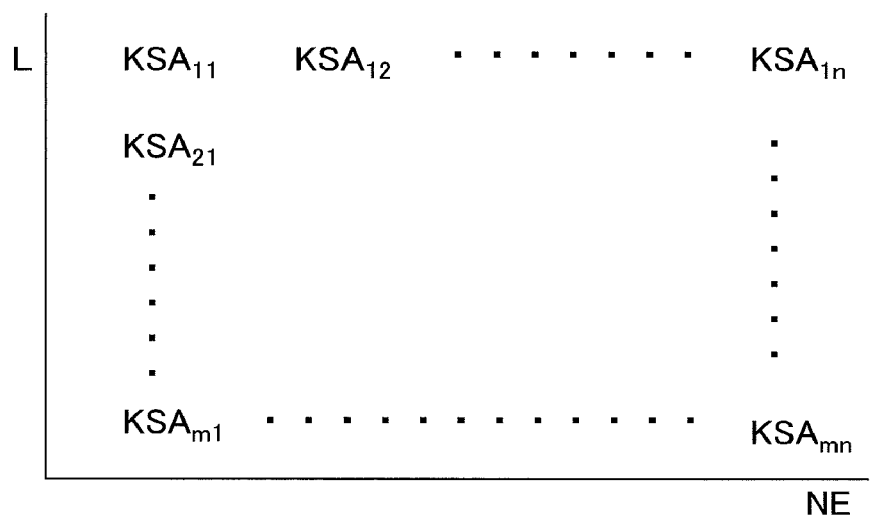
FIG. 8 is a view showing a map of a correction value KSA.

In this regard, such control for lowering the target EGR rate RAO is performed by lowering the EGR valve target opening degree SA. In the embodiment according to the present invention, a correction amount KSA of the EGR valve target opening degree SA required for lowering the target EGR rate RAO by exactly a unit EGR rate is found in advance. This correction amount KSA of the EGR valve target opening degree SA is for example stored in advance of the memory 32 in the form of a map such as shown in FIG. 8 as a function of the engine load L and the engine speed NE. In this case, the correction value KKSA for the EGR valve target opening degree SA is made the correction amount KSA calculated from the map shown in FIG. 8 multiplied with the correction value KKRA for the basic EGR rate RA (KSA·KKRA).

Therefore, in the embodiment according to the present invention, as shown in FIG. 6, the EGR valve target opening degree SA calculated based on the engine load L and the engine speed NE from the map shown in FIG. 4 is multiplied with the correction value KKSA calculated based on the atmospheric pressure, intake temperature, and engine cooling water temperature (=KSA·KKRA) and the multiplied result is made the final EGR valve target opening degree SA.

Figure 9:
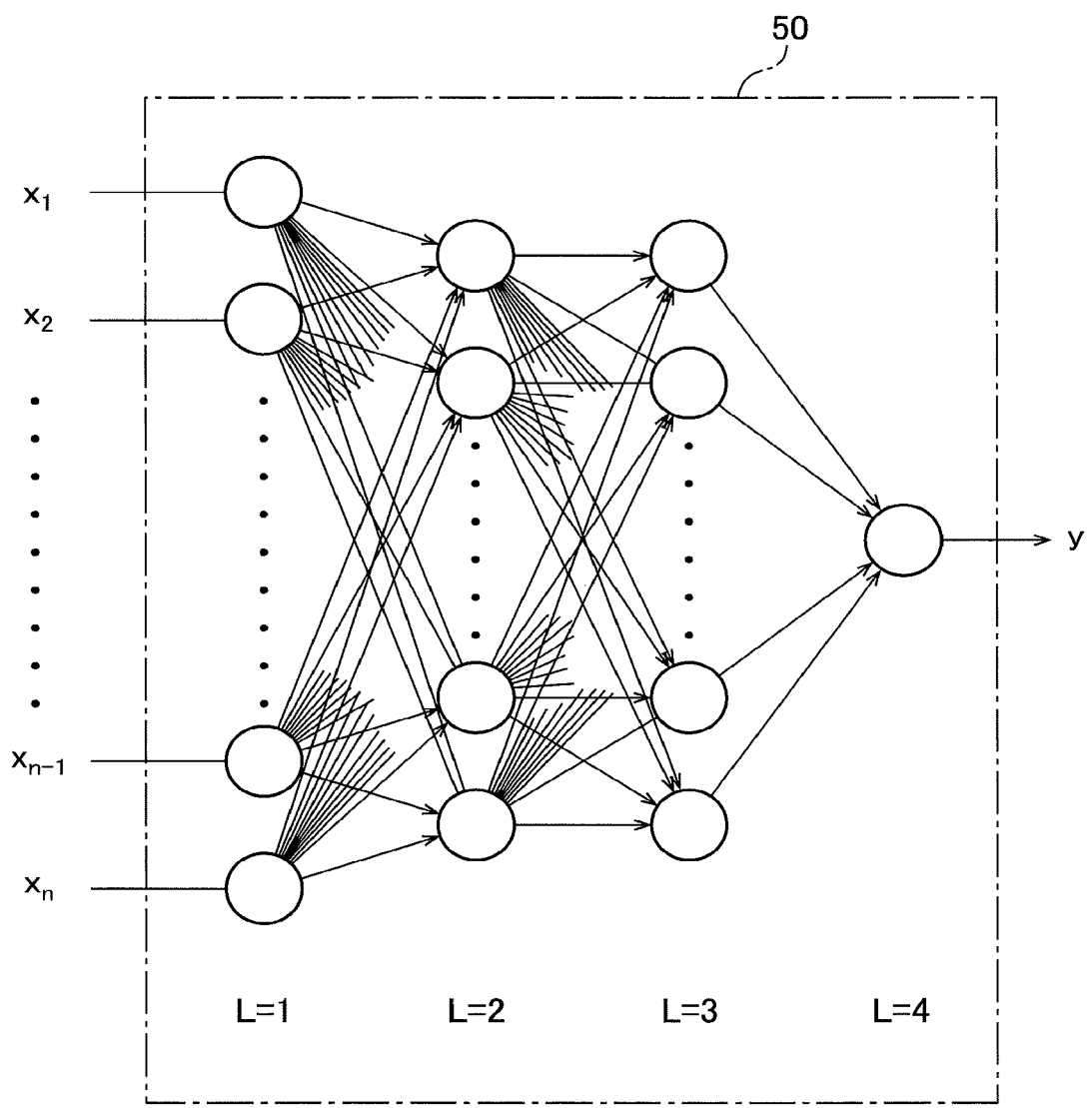
FIG. 9 is a view showing a neural network used in an embodiment according to the present invention.

Now then, in the embodiment according to the present invention, the neural network is used to prepare a model for estimation of the target EGR rate RAO. Any abnormality of the exhaust gas recirculation system is detected based on the difference of the estimated value of the target EGR rate RAO found by this target EGR rate estimation model and the target EGR rate RAO. Therefore, first, the neural network used for preparing this model for estimation of the target EGR rate will be explained with reference to FIG. 9. Referring to FIG. 9, in this neural network 50 as well, in the same way as the neural network shown in FIG. 2, L=1 shows the input layer, L=2 and L=3 show hidden layers, and L=4 shows the output layer. As shown in FIG. 9, the input layer (L=1) is comprised of "n" number of nodes. "n" number of input value $x_1, x_2 \ldots x_{n-1}, x_n$ are input to the nodes of the input layer (L=1). On the other hand, FIG. 9 describes the hidden layer (L=2) and hidden layer (L=3), but the number of the hidden layers may also be one or another number. Further, the numbers of nodes of these hidden layers may also be made any numbers. Note that, there is a single node at the output layer (L=4). The output value from the node of the output layer is shown by "y". In this case, the output value "y" becomes the estimated value of the target EGR rate RA.

Next, the input values $x_1, x_2 \ldots x_n$ in FIG. 9 will be explained while referring to the list shown in FIG. 10. Further, as explained above, if the amount of exhaust gas recirculated from the EGR passage 13 to the inside of the surge tank 6 is reduced, the pressure inside the surge tank 6, that is, the intake pressure, falls and the amount of intake air increases. That is, the intake pressure and the amount of intake air are greatly affected by the EGR rate. On the other hand, the basic EGR rate RA is determined if the engine load L and the engine speed NE are determined. Therefore, if the engine load L, engine speed NE, intake pressure, and amount of intake air change, the EGR rate changes to an EGR rate corresponding to the engine load L, engine speed NE, intake pressure, and amount of intake air.

In this way, the EGR rate is governed by the engine load L, engine speed NE, intake pressure, and amount of intake air, and accordingly. FIG. 10 lists the engine load L, engine speed NE, intake pressure, and amount of intake air as essential input parameters. On the other hand, as explained above, to prevent the occurrence of misfire, it is preferable to correct the basic EGR rate RA in accordance with the atmospheric pressure, intake temperature, and engine cooling water temperature. These atmospheric pressure, intake temperature, and the engine cooling water temperature are not essential input parameters. Therefore, as shown in FIG. 10, these atmospheric pressure, intake temperature, and engine cooling water temperature are listed as auxiliary input parameters.

In the present invention, basically, the values of only these essential parameters are made the input values $x_1, x_2 \ldots x_{n-1}, x_n$ in FIG. 9. In this case, in addition to the values of these essential input parameters, the values of the auxiliary input parameters may also be made the input values $x_1, x_2 \ldots x_{n-1}, x_n$ in FIG. 9. Note that, as explained above, in the embodiment according to the present invention, in addition to the values of the essential input parameters, values of auxiliary input parameters will also be made the input values $x_1, x_2 \ldots x_{n-1}, x_n$ in FIG. 9. Therefore, below, the embodiment according to the present invention will be explained using as an example the case where in addition to the values of the essential input parameters, the values of the auxiliary input parameters will also be made the input values $x_1, x_2 \ldots x_{n-1}, x_n$ in FIG. 9.

FIG. 11 shows training data sets prepared using the input values $x_1, x_2 \ldots x_{n-1}, x_n$ and the training data yt. In this FIG. 11, the input values $x_1, x_2 \ldots x_{n-1}, x_n$ respectively show the engine load L, engine speed NE, intake pressure, amount of intake air, atmospheric pressure PA, intake temperature MT, and engine cooling water temperature TW. In this case, the engine load L and the engine speed NE are calculated inside the electronic control unit 30, the intake pressure is detected by the intake pressure sensor 16, the amount of intake air is detected by the intake air amount detector 8, the atmospheric pressure is detected by the atmospheric pressure sensor 18, the intake temperature is detected by the intake temperature sensor 17, and the engine cooling water temperature TW is detected by the water temperature sensor 19.

On the other hand, the training data yt in FIG. 11 shows the target EGR rate RAO. As shown in FIG. 11, in the training data sets, "m" number of data expressing the relationship between the input values $x_1, x_2 \ldots x_{n-1}, x_n$ and the training data yt are acquired. For example, in the second data (No. 2), the acquired input values $x_{12}, x_{22} \ldots x_{m-12}, x_{m2}$ and training data $yt_2$ are listed, while in the m−1-th data (No. m−1), the input values $x_{1m-1}, x_{2m-1} \ldots x_{n-1m-1}, x_{nm-1}$ of the acquired input parameters and training data $yt_{m-1}$ are listed.

Figure 12:
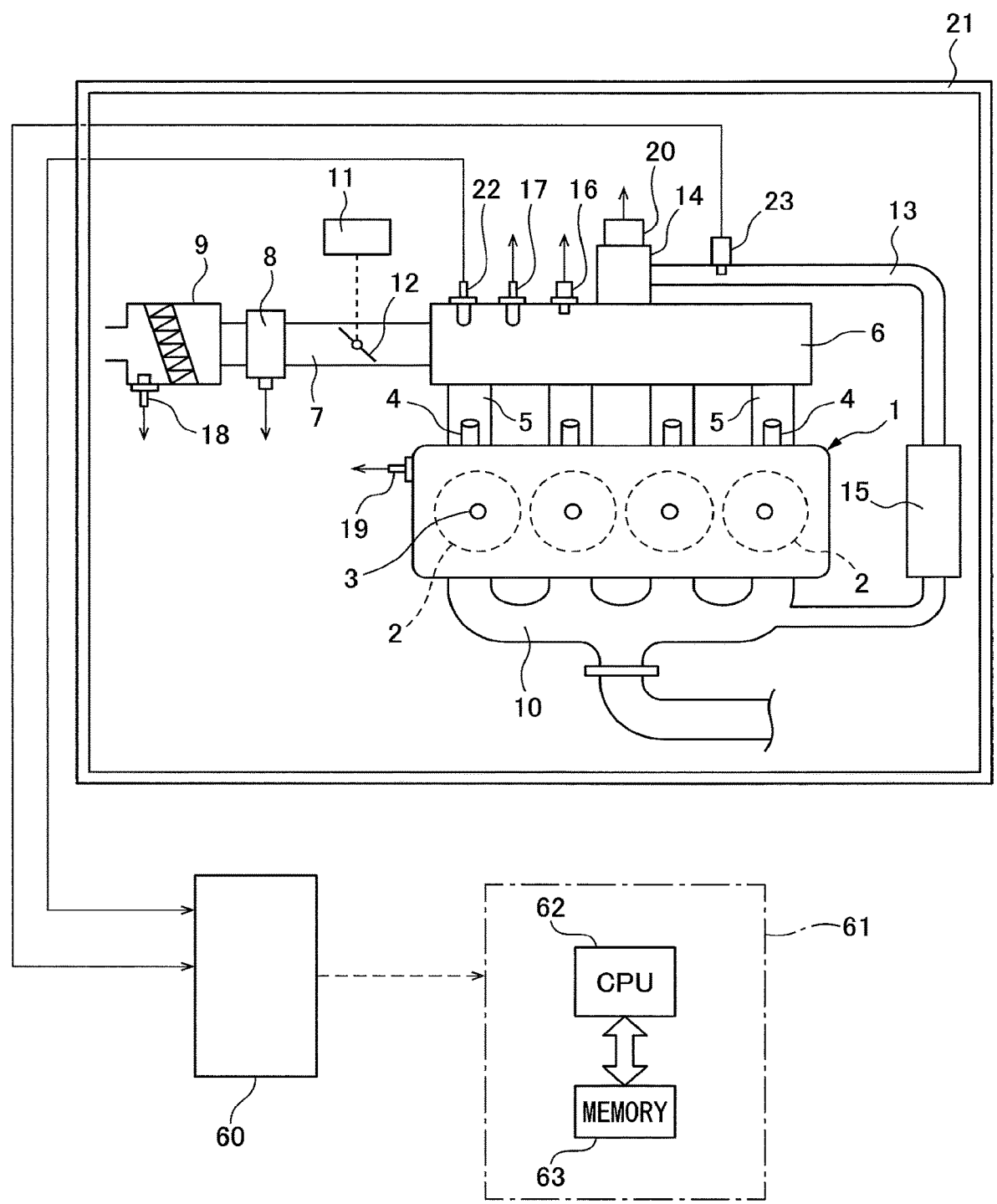
FIG. 12 is a view for explaining a learning method.

In the embodiment according to the present invention, the training data set shown in FIG. 11 is used for learning of the weights of the neural network 50 shown in FIG. 9. Therefore, next, the method of preparation of the training data set shown in FIG. 11 will be explained. FIG. 12 shows an example of the method of preparation of a training data set. Referring to FIG. 12, the engine body 1 shown in FIG. 1 is placed in a sealed test chamber 21 able to be adjusted in chamber pressure and chamber temperature. Inside this sealed test chamber 21, an engine cooling water temperature adjustment device able to freely adjust the temperature of the engine cooling water is set. The engine body 1 set inside the sealed test chamber 21 is operated by the test control device 60 to prepare training data sets. Note that, in the engine body 1 shown in FIG. 12, to measure the EGR rate, a $CO_2$ concentration sensor 22 for detecting the $CO_2$ concentration of the gas inside the surge tank 6 is additionally set in the surge tank 6. Further, a $CO_2$ concentration sensor 23 for detecting the $CO_2$ concentration of the recirculated exhaust gas inside the EGR passage 13 is additionally set in the EGR passage 13.

Next, the method of measuring the EGR rate by these pair of $CO_2$ concentration sensors 22 and 23 will be explained. If designating the amount of intake air flowing from the outside air to the inside of the surge tank 6 as QA, designating the amount of recirculated exhaust gas flowing from the EGR passage 13 to the inside of the surge tank 6 as QE, designating the $CO_2$ concentration in the surge tank 6 as $[CO_2]$in, designating the $CO_2$ concentration in the EGR passage 13 as $[CO_2]$ex, and designating the $CO_2$ concentration in the outside air as $[CO_2]$out, the sum of the amount of $CO_2$ flowing from the outside air to the inside of the surge tank 6 and the amount of $CO_2$ flowing from the EGR passage 13 to the inside of the surge tank 6 becomes equal to the amount of $CO_2$ inside the surge tank 6, so the following formula stands:

$$QA \cdot [CO_2]out + QE \cdot [CO_2]ex = (QA + QE) \cdot [CO_2]in \quad (9)$$

$$\text{Therefore, } QA = QE \cdot \frac{[CO_2]ex - [CO_2]in}{[CO_2]in - [CO_2]out}$$

On the other hand, the EGR rate is expressed by the following formula:

$$EGR \text{ rate} = \frac{QE}{QA + QE} \cdot 100(\%) \quad (10)$$

If entering the above formula (9) into the above formula (10), the EGR rate is expressed by the following formula:

$$EGR \text{ rate} = \frac{[CO_2]in - [CO_2]out}{[CO_2]ex - [CO_2]out} \quad (11)$$

That is, the EGR rate becomes a function of the $CO_2$ concentration $[CO_2]$in in the surge tank 6, the $CO_2$ concentration $[CO_2]$ex in the EGR passage 13, and the $CO_2$ concentration $[CO_2]$out in the outside air.

Here, the $CO_2$ concentration $[CO_2]$in in the surge tank 6 and the $CO_2$ concentration $[CO_2]$ex in the EGR passage 13 can be detected by the $CO_2$ concentration sensors 22 and 23 when the EGR valve 14 opens and recirculated exhaust gas flows from the EGR passage 13 into the surge tank 6, while the $CO_2$ concentration $[CO_2]$out in the outside air can be detected by the $CO_2$ concentration sensor 22 when the EGR valve 14 closes and the flow of recirculated exhaust gas from the EGR passage 13 to the inside of the surge tank 6 is made to stop. In the embodiment according to the present invention, the EGR valve 14 is made to open and close while finding the $CO_2$ concentration $[CO_2]$in inside the surge tank 6, $CO_2$ concentration $[CO_2]$ex inside the EGR passage 13, and $CO_2$ concentration $[CO_2]$out inside the outside air from the detection values of the $CO_2$ concentration sensors 22 and 23. The above formula (11) is used to measure the EGR rate from the $CO_2$ concentration $[CO_2]$in inside the surge tank 6, the $CO_2$ concentration $[CO_2]$ex inside the EGR passage 13, and the $CO_2$ concentration $[CO_2]$out inside the outside air.

Now then, in the embodiment according to the present invention, in the test control device 60, the data for preparing the training data set is acquired. Further, when acquiring the data, processing for preparing the map of the EGR valve target opening degree SA shown in FIG. 4 is performed. In this case, in this test control device 60, the processing for acquiring data for preparing the training data set and processing for preparing a map of the EGR valve target opening degree SA shown in FIG. 4 are performed while successively changing the input value $x_1$ expressing the engine load L, the input value $x_2$ expressing the engine speed NE, the input value $x_3$ expressing the intake pressure, the input value $x_4$ expressing the amount of intake air, the input value $x_5$ expressing the atmospheric pressure PA, the input value $x_6$ expressing the intake temperature MT, and the input value $x_7$ expressing the engine cooling water temperature TW.

Figure 13:
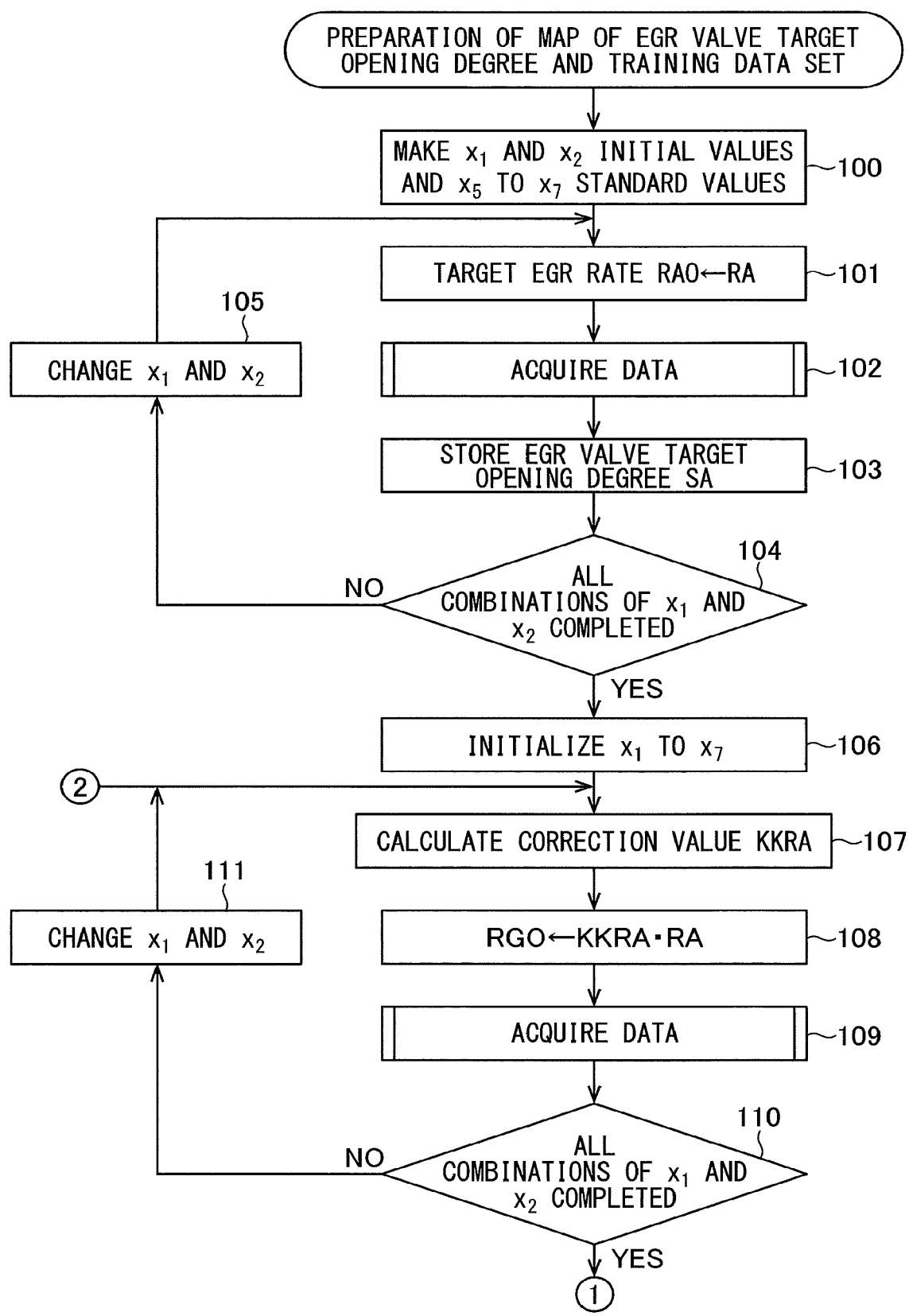
FIG. 13 is a flow chart for preparing an EGR valve target opening degree map and training data set.
Figure 14:
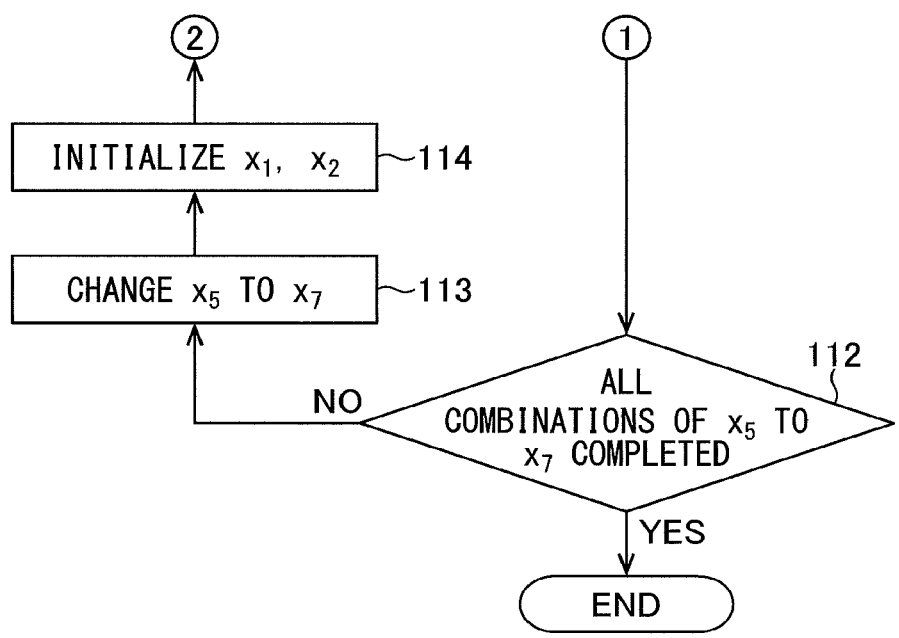
FIG. 14 is a flow chart for preparing an EGR valve target opening degree map and training data set.

FIG. 13 and FIG. 14 show a routine for preparation of an EGR valve target opening degree map and training data set performed in the test control device 60. Referring to FIG. 13, first, at step 100, the input value $x_1$ expressing the engine load L and the input value $x_2$ expressing the engine speed NE are initialized and the input value $x_5$ expressing the atmospheric pressure PA, the input value $x_6$ expressing the intake temperature MT, and the input value $x_7$ expressing the engine cooling water temperature TW are made standard values, that is, 1.0. Next, at step 101, the basic EGR rate RA shown in FIG. 3B is made the target EGR rate RAO. Next, at step 102, various data when the measured EGR rate becomes the target EGR rate RAO is acquired. The processing for acquiring the various data at this step 102 is performed by a subroutine shown in FIG. 15.

Figure 15:
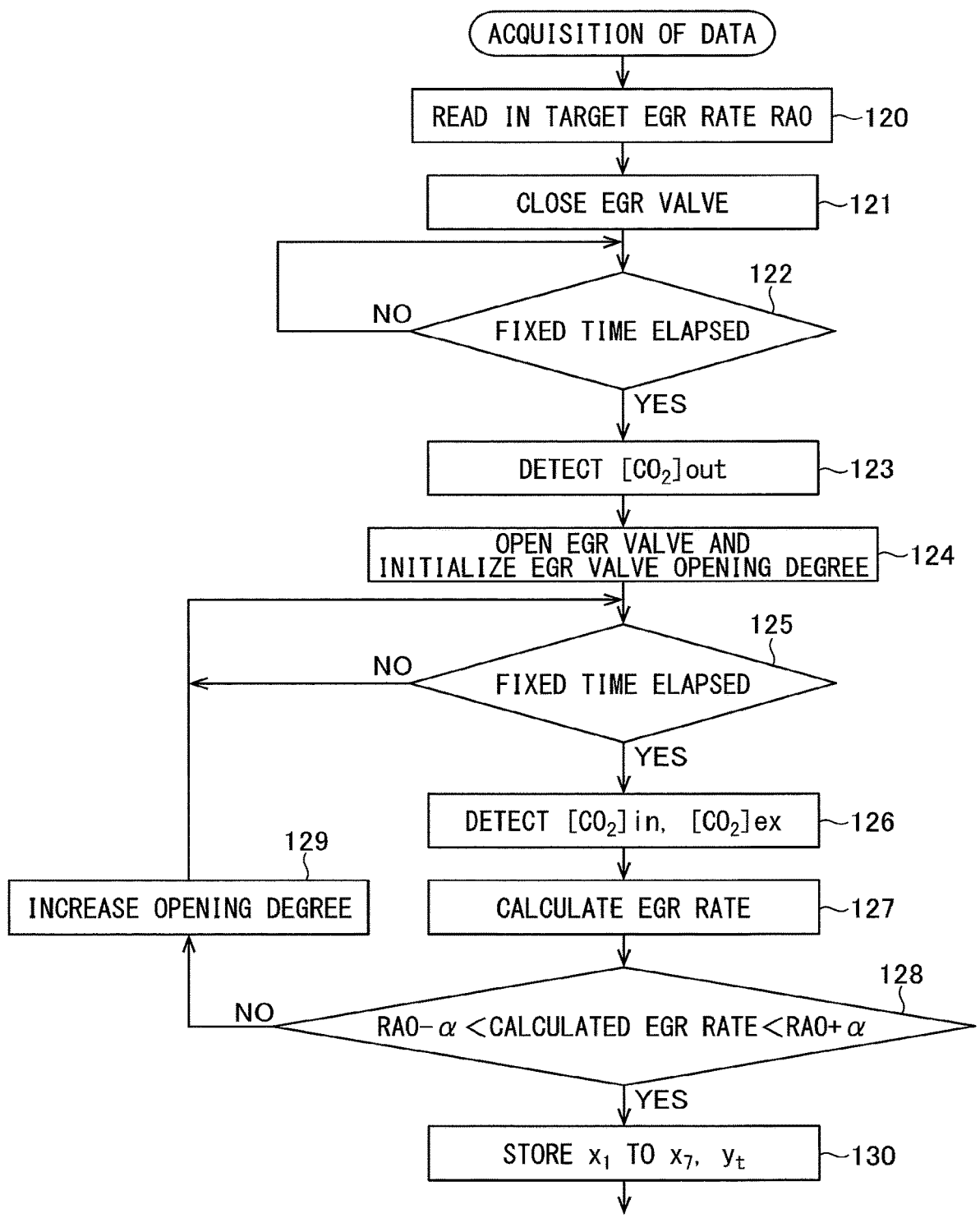
FIG. 15 is a flow chart for acquiring data.

Therefore, here, the subroutine shown in FIG. 15 will be explained first. Referring to FIG. 15, first, at step 120, the target EGR rate RAO is read in. Next, at step 121, the EGR valve 14 is made to close. Next, at step 122, it is judged whether a fixed time has elapsed. When the fixed time has elapsed, the routine proceeds to step 123. At step 123, the $CO_2$ concentration in the surge tank 6 is detected by the $CO_2$ concentration sensor 22. At this time, outside air is flowing into the surge tank 6, so at this time, what is detected by the $CO_2$ concentration sensor 22 becomes the $CO_2$ concentration $[CO_2]$out in the outside air. That is, at step 123, the $CO_2$ concentration $[CO_2]$out in the outside air is detected by the $CO_2$ concentration sensor 22.

Next, at step 124, the EGR valve 14 is made to open and the opening degree of the EGR valve 14 is made a small initial value. Next, at step 125, it is judged if a fixed time period has elapsed. When the fixed time period has elapsed, the routine proceeds to step 126. At step 126, the $CO_2$ concentration [$CO_2$]in in the surge tank 6 is detected by the $CO_2$ concentration sensor 22 while the $CO_2$ concentration [$CO_2$]ex inside the EGR passage 13 is detected by the $CO_2$ concentration sensor 23. Next, at step 127, the EGR rate is calculated from the above mentioned formula (11) based on the $CO_2$ concentration [$CO_2$]out in the outside air detected at step 123 and the $CO_2$ concentration [$CO_2$]in in the surge tank 6 and the $CO_2$ concentration [$CO_2$]ex in the EGR passage 13 detected at step 126. This EGR rate shows the actually measured value of the EGR rate.

Next, at step 128, it is judged if the calculated EGR rate, that is, the actually measured value of the EGR rate, is between the value of the target EGR rate RAO from which a small constant α is subtracted (RAO−α) and the value of the target EGR rate RAO to which a small constant value α is added (RAO+α), that is, whether the actually measured value of the EGR rate becomes the target EGR rate RAO. When it is judged that the actually measured value of the EGR rate is not the target EGR rate RAO, the routine proceeds to step 129 where the opening degree of the EGR valve 14 is increased by exactly a small constant opening degree. Next, the routine returns to step 125. Next, at step 126, the $CO_2$ concentration [$CO_2$]in in the surge tank 6 is again detected by the $CO_2$ concentration sensor 22 while the $CO_2$ concentration [$CO_2$]ex inside the EGR passage 13 is again detected by the $CO_2$ concentration sensor 23, and at step 127, the EGR rate is calculated and, at step 128, it is judged if the actually measured value of the EGR rate becomes the target EGR rate RAO.

When at step 128 it is judged that the calculated EGR rate, that is, the actually measured value of the EGR rate, becomes the target EGR rate RAO, the routine proceeds to step 130. At step 130, all of the input values $x_1, x_2 \ldots x_{n-1}, x_n$ that is, the input value $x_1$ expressing the engine load L, the input value $x_2$ expressing the engine speed NE, the input value $x_3$ expressing the intake pressure, the input value $x_4$ expressing the amount of intake air, the input value $x_5$ expressing the atmospheric pressure PA, the input value $x_6$ expressing the intake temperature MT, and the input value $x_7$ expressing the engine cooling water temperature TW at this time, are stored in the memory of the test control device 60. The target EGR rate RAO at this time, that is, the basic EGR rate RA shown in FIG. 3B, is stored as the training data yt in the memory of the test control device 60. At this time, the input values $x_1, x_2 \ldots x_{n-1}, x_n$ and training data yt stored in the memory of the test control device 60 form the No. 1 data set in FIG. 11.

If at step 130 the input values $x_1, x_2 \ldots x_{n-1}, x_n$ and training data yt are stored in the memory of the test control device 60, the routine proceeds to step 103 of FIG. 13. At step 103, the opening degree of the EGR valve 14 at this time, that is, the time when the actually measured value of the EGR rate becomes the target EGR rate RAO, is detected by the EGR valve opening degree sensor 20, and the detected opening degree of the EGR valve 14 is stored as the EGR valve target opening degree SA in the map shown in FIG. 4. Therefore, the EGR valve target opening degree SA stored in the map shown in FIG. 4 shows the opening degree of the EGR valve 14 required for making EGR rate match the target EGR rate RAO.

Next, at step 104, it is judged if the data has finished being acquired for all combinations of the input value $x_1$ and the input value $x_2$, that is, all combinations of the engine load L and the engine speed NE. When it is judged that the data has not finished being acquired for all combinations of the input value $x_1$ and the input value $x_2$, the routine proceeds to step 105 where either of the input value $x_1$ and the input value $x_2$, that is, the engine load L or the engine speed NE, is changed. Next, at step 101, the basic EGR rate RA shown in FIG. 3B acquired based on the changed engine load L and the engine speed NE is made the target EGR rate RAO.

Next, at step 102, due to the subroutine shown in FIG. 15, all of the input values $x_1, x_2 \ldots x_{n-1}, x_n$ and training data yt when the actually measured value of the EGR rate becomes the target EGR rate RAO are stored in the memory of the test control device 60. Due to this, a new data set comprised of the input values $x_1, x_2 \ldots x_{n-1}, x_n$ and training data yt is formed. Next, at step 103, the opening degree of the EGR valve 14 when the actually measured value of the EGR rate becomes the target EGR rate RAO is stored as the EGR valve target opening degree SA in the map shown in FIG. 4. Such an action for acquiring data is repeated until the data has finished being acquired for all combinations of the engine load L and the engine speed NE.

When at step 104 it is judged that the data has finished being acquired for all combinations of the input value $x_1$ and the input value $x_2$, that is, all combinations of the engine load L and the engine speed NE, the routine proceeds to step 106 where when the input value $x_5$ expressing the atmospheric pressure PA, the input value $x_6$ expressing the intake temperature MT, and the input value $x_7$ expressing the engine cooling water temperature TW are not the standard values, that is, 1.0, the data when successively changing the input value $x_5$, the input value $x_6$, and the input value $x_7$ are acquired. In this case, in the embodiment according to the present invention, the input value $x_5$ is successively changed to a plurality of atmospheric pressures $PA_1, PA_2, PA_3, \ldots PA_j$ at certain intervals as shown in FIG. 7, the input value $x_6$ is successively changed to a plurality of intake temperatures $MT_1, MT_2, MT_3, \ldots MT_j$ at certain intervals as shown in FIG. 7, and the input value $x_7$ is successively changed to a plurality of engine cooling water temperatures $TW_1, TW_2, TW_3, \ldots ATW_j$ at certain intervals as shown in FIG. 7.

That is, first, at step 106, all of the input values $x_1, x_2 \ldots x_{n-1}, x_n$ are initialized. Next, at step 107, from the relationship shown in FIG. 7, the correction value KA corresponding to the atmospheric pressure PA, the correction value KB corresponding to the intake temperature TM, and the correction value KC corresponding to the engine cooling water temperature TW are calculated, and the correction value KKRA (=KA·KB·KC) for the basic EGR rate RA is calculated from these correction value KA, correction value KB, and correction value KC. Next, at step 108, the value KKRA·RA obtained by multiplying the correction value KKRA with the basic EGR rate RA shown in FIG. 3B is made the target EGR rate RAO.

Next, at step 109, due to the subroutine shown in FIG. 15, all of the input values $x_1, x_2 \ldots x_{n-1}, x_n$ and training data yt when the actually measured value of the EGR rate becomes the target EGR rate RAO are stored in the memory of the test control device 60. Due to this, a new data set comprised of the input values $x_1, x_2 \ldots x_{n-1}, x_n$ and training data yt is formed. Next, at step 110, it is judged if the data has finished being acquired for all combinations of the input value $x_1$ and the input value $x_2$, that is, for all combinations of the engine load L and the engine speed NE. When it is judged that the data has not finished being acquired for all combinations of the input value $x_1$ and the input value $x_2$, the routine proceeds to step 111 where either of the input value $x_1$ and the input value $x_2$, that is, either of the engine load L and the engine speed NE, is changed.

Next, at step 107, the correction value KKRA is calculated based on the engine load L and engine speed NE after the change. At this time, none of the input value $x_5$, the input value $x_6$, and the input value $x_7$ are changed, so the correction value KKRA is maintained at the same value. Next, at step 108, the value KKRA·RA obtained by multiplying the correction value KKRA with the basic EGR rate RA shown in FIG. 3B acquired based on the engine load L and engine speed NE after the change is made the target EGR rate RAO. At step 109, due to the subroutine shown in FIG. 15, all of the input values $x_1, x_2 \ldots x_{n-1}, x_n$ and training data yt when the actually measured value of the EGR rate becomes the target EGR rate RAO are stored in the memory of the test control device 60. Due to this, a new data set comprised of the input values $x_1, x_2 \ldots x_{n-1}, x_n$ and training data yt is formed. Such an action for acquiring data is repeated until the data has finished being acquired for all combinations of the engine load L and the engine speed NE.

When at step 110 it is judged that the data has finished being acquired for all combinations of the input value $x_1$ and the input value $x_2$, that is, all combinations of the engine load L and the engine speed NE, the routine proceeds to step 112 where it is judged if the data has finished being acquired for all combinations of the input value $x_5$, the input value $x_6$, and the input value $x_7$, that is, for all combinations of the atmospheric pressure PA, intake temperature MT, and engine cooling water temperature TW. When it is judged that the data has not finished being acquired for all combinations of the input value $x_5$, the input value $x_6$, and the input value $x_7$, the routine proceeds to step 113 where any one of the atmospheric pressure PA, intake temperature MT, and engine cooling water temperature TW is changed. Next, at step 114, the input value $x_1$ and the input value $x_2$ are initialized. Next, again the routine returns to step 107.

At this time, one of the atmospheric pressure PA, intake temperature MT, and engine cooling water temperature TW is changed, so at step 107 the correction value KKRA is updated. Next, at step 108, the target EGR rate RAO is calculated. At step 109, using the subroutine shown in FIG. 15, all of the input values $x_1, x_2 \ldots x_{n-1}, x_n$ and training data yt when the actually measured value of the EGR rate becomes the target EGR rate RAO is stored in the memory of the test control device 60. Due to this, a new data set comprised of the input values $x_1, x_2 \ldots x_{n-1}, x_n$ and training data yt is formed. Such an action for acquiring data is repeated until the data has finished being acquired for all combinations of the engine load L and the engine speed NE.

When at step 110 it is judged that the data has been acquired for all combinations of the engine load L and the engine speed NE, the routine proceeds to step 112. When at step 112 it is judged that the data has not finished being acquired for all combinations of the input value $x_5$, the input value $x_6$, and the input value $x_7$, that is, all combinations of the atmospheric pressure PA, intake temperature MT, and engine cooling water temperature TW, the routine proceeds to step 113 where one of the atmospheric pressure PA, intake temperature MT, and engine cooling water temperature TW is changed. Next, again, this data acquisition action is performed. This action of acquisition of the data is repeatedly performed until data has finished being acquired for all combinations of the atmospheric pressure PA, intake temperature MT, and engine cooling water temperature TW.

In this way, the data required for preparing the training data set is acquired. That is, the No. 1 to No. m input values $x_{1m}, x_{2m} \ldots x_{nm-1}, x_{nm}$ and training data $yt_m$ (m=1, 2, 3 ... m) of the training data set shown in FIG. 11 are stored in the memory of the test control device 60. Due to this, the training data set such as shown in FIG. 11 is prepared. The electronic data of the training data set prepared in this way is used to learn the weights of the neural network 50 shown in FIG. 9.

In the example shown in FIG. 12, a learning device 61 for learning the weights of the neural network is provided. As this learning device 61, a PC may also be used. As shown in FIG. 12, this learning device 61 is provided with a CPU (microprocessor) 62 and a storage device 63, that is, a memory 63. In the example shown in FIG. 12, the numbers of nodes of the neural network 50 shown in FIG. 9 and the electronic data of the training data set prepared are stored in the memory 63 of the learning device 61 and the weights of the neural network 50 are learned at the CPU 62.

Figure 16:
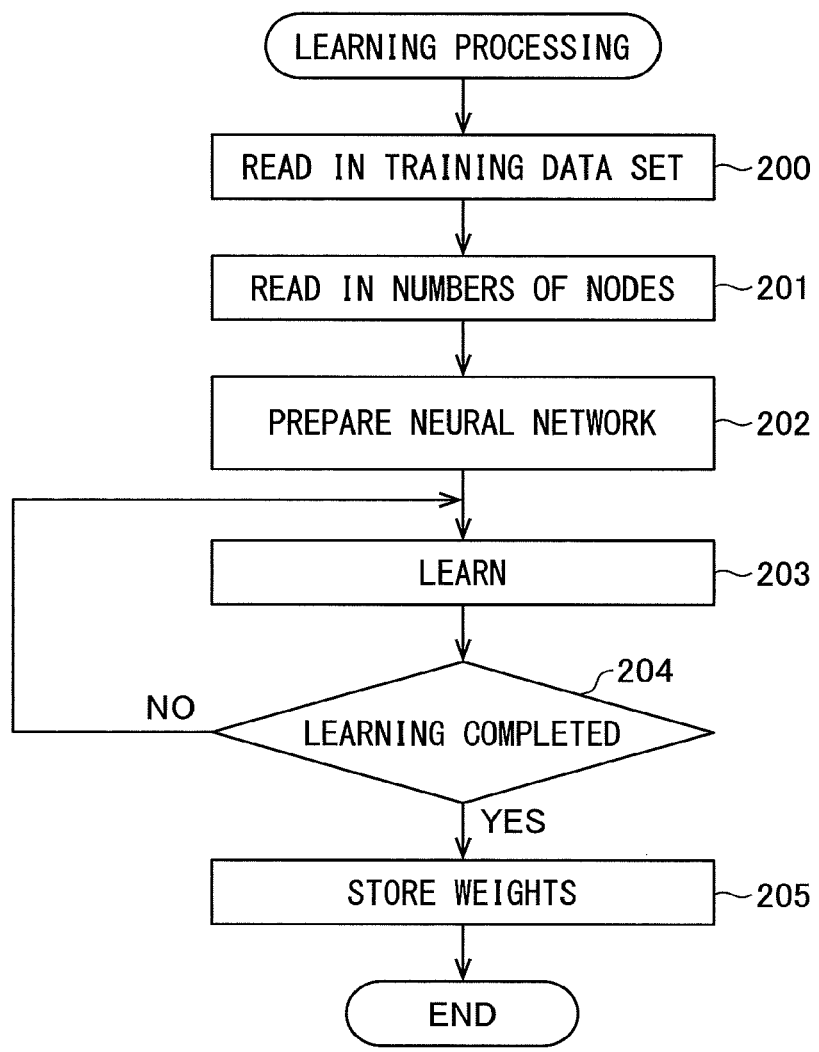
FIG. 16 is a flow chart for execution of learning processing.

FIG. 16 shows the processing routine for learning the weights of the neural network 50 performed at the learning device 61. Referring to FIG. 16, first, at step 200, various data of the training data set for the neural network 50 stored in the memory 63 of the learning device 61 are read in. Next, at step 201, the number of nodes of the input layer (L=1) of the neural network 50, the numbers of nodes of the hidden layer (L=2) and hidden layer (L=3), and the number of nodes of the output layer (L=4) are read in. Next, at step 202, a neural network 50 such as shown in FIG. 9 is prepared based on these numbers of nodes.

Next, at step 203, the weights of the neural network 50 are learned. At step 203, first, the first (No. 1) input values $x_1, x_2 \ldots x_{n-1}, x_n$ of FIG. 11 are input to the nodes of the input layer (L=1) of the neural network 50. At this time, an output value "y" showing the estimated value of the target EGR rate is output from the output layer of the neural network 50. If the output value "y" is output from the output layer of the neural network 50, the square error $E=\frac{1}{2}(y-y_{t1})^2$ between this output value "y" and the first (No. 1) training data $yt_1$ is calculated. The weights of the neural network 50 are learned using the above-mentioned error backpropagation method so that this square error E becomes smaller.

If the weights of the neural network 50 finish being learned based on the first (No. 1) data of FIG. 11, next, the weights of the neural network 50 are learned using the error backpropagation method based on the second (No. 2) data of FIG. 11. Similarly, the weights of the neural network 50 are successively learned in order up to the m-th (No. m) weight of FIG. 11. If the weights of the neural network 50 finish being learned for all of the first (No. 1) to m-th (No. m) one of FIG. 11, the routine proceeds to step 204.

At step 204, for example, the square sum error E between all of the output values "y" of the neural network from the first (No. 1) to m-th (No. m) of FIG. 11 and training data yt is calculated, and it is judged if this square sum error E becomes a preset set error or less. When it is judged that this square sum error E does not become the preset set error or less, the routine returns to step 203 where the weights of the neural network 50 are again learned based on the training data set shown in FIG. 11. Next, the weights of the neural network 50 continue being learned until the square sum error E becomes a preset set error or less. When at step 204 it is judged that the square sum error E becomes the preset set error or less, the routine proceeds to step 205 where the learned weights of the neural network 50 are stored inside the memory 63 of the learning device 61. By doing this, a model for estimation of the target EGR rate is prepared.

Figure 17:
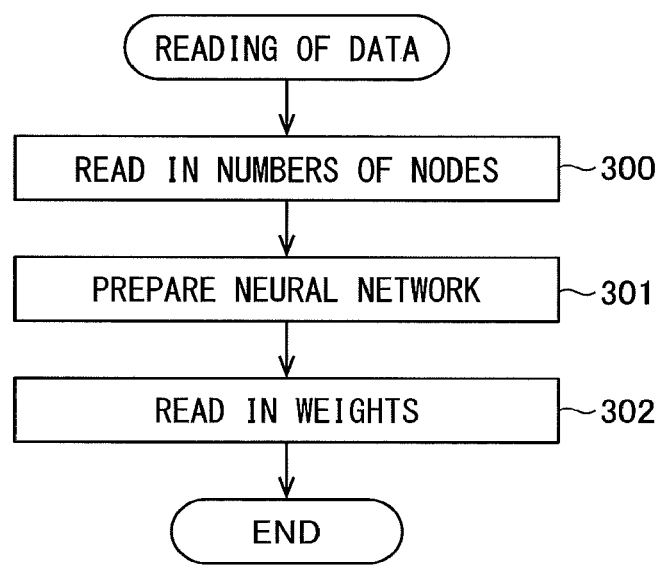
FIG. 17 is a flow chart for reading data into an electronic control unit.

In the embodiment according to the present invention, such a prepared model for estimation of the target EGR rate is used to detect any abnormality in an exhaust gas recirculation system in a commercially available vehicle. For this purpose, the model for estimation of the target EGR rate is stored in the electronic control unit 30 of the commercially available vehicle. FIG. 17 shows the routine for reading data into the electronic control unit, which is performed in the electronic control unit 30 of the commercially available vehicle for storing the model for estimation of the target EGR rate in the electronic control unit 30.

Referring to FIG. 17, first, at step 300, the number of nodes of the input layer of the neural network 50 shown in FIG. 9 (L=1), the numbers of nodes of the hidden layer (L=2) and hidden layer (L=3), and the number of nodes of the output layer (L=4) are read into the memory 32 of the electronic control unit 30. Next, at step 301, the neural network 50 such as shown in FIG. 9 is prepared based on these numbers of node. Next, at step 302, the learned weights of the neural network 50 are read in the memory 32 of the electronic control unit 30. Due to this, the model for estimation of the target EGR rate is stored in the electronic control unit 30 of a commercially available vehicle.

Figure 18:
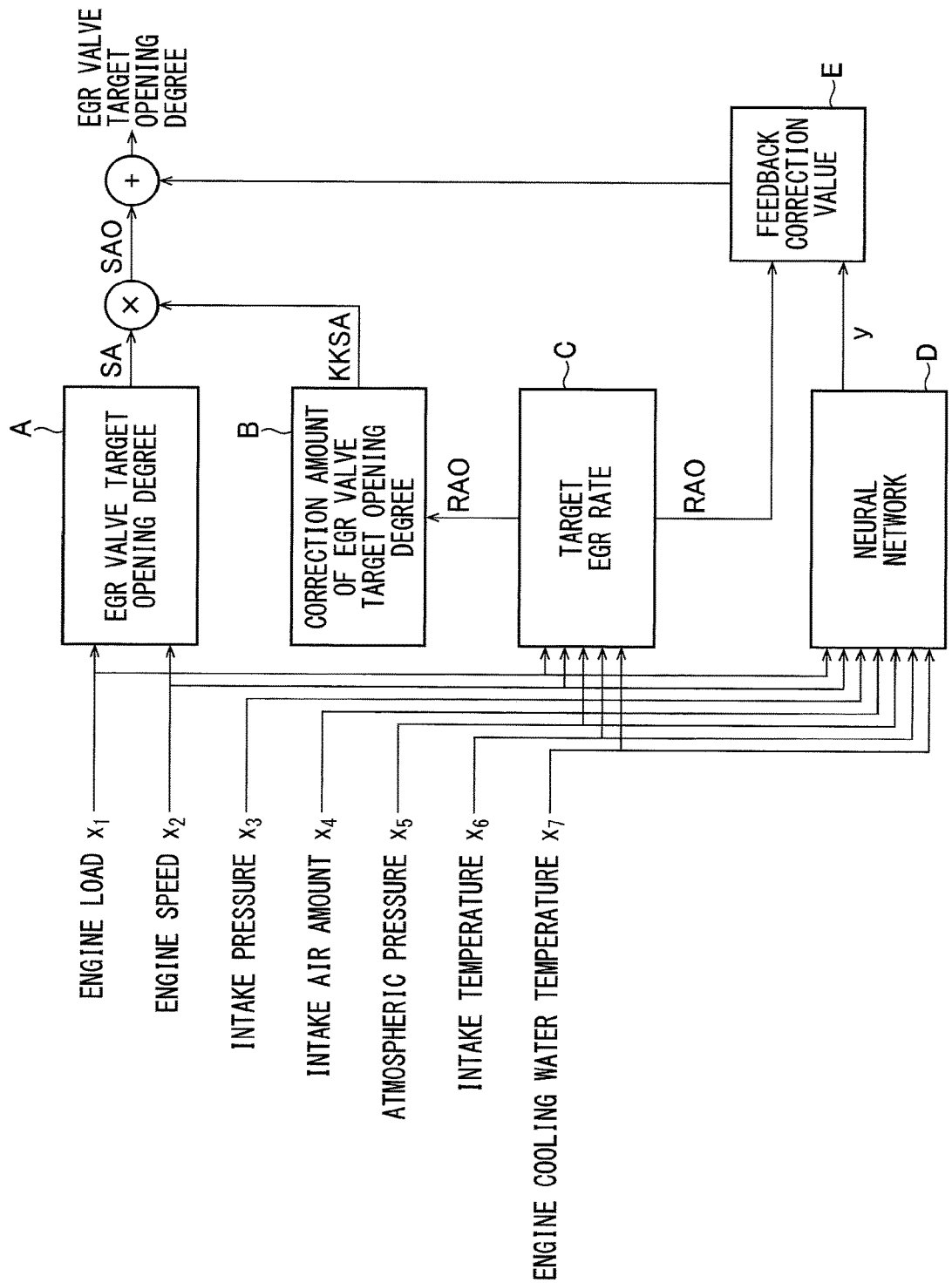
FIG. 18 is a view of the functional configuration for finding an EGR valve target opening degree.

FIG. 18 shows a view of the functional configuration for finding the EGR valve target opening degree performed in the electronic control unit 30 of a commercially available vehicle. Referring to FIG. 18, in FIG. 18, the input value $x_1$ expressing the engine load L, the input value $x_2$ expressing the engine speed NE, the input value $x_3$ expressing the intake pressure, the input value $x_4$ expressing the amount of intake air, the input value $x_5$ expressing the atmospheric pressure PA, the input value $x_6$ expressing the intake temperature MT, and the input value $x_7$ expressing the engine cooling water temperature TW are shown. Further, in FIG. 18, five functional blocks A, B, C, D, and E are shown.

As shown in FIG. 18, in the functional block A, the EGR valve target opening degree SA is calculated based on the engine load ($x_1$) and the engine speed ($x_2$) from the map shown in FIG. 4. On the other hand, in the functional block C, the target EGR rate RAO (=KKRA·RA) is calculated from the basic EGR rate RA shown in FIG. 3B and the correction value KA, correction value KB, and correction value KC shown in FIG. 7. In the functional block B, the correction amount KKSA (=KSA·RAO) of the EGR valve target opening degree SA is calculated from the target EGR rate RAO and the correction amount KSA shown in FIG. 8. By multiplying this correction value KKSA with the EGR valve target opening degree SA, the EGR valve target opening degree SAO (=SA·KKSA) is calculated.

On the other hand, in the functional block D, the neural network 50 is used to calculate the estimated value "y" of the target EGR rate RAO from the engine load ($x_1$), engine speed ($x_2$), intake pressure ($x_3$), amount of intake air($x_4$), atmospheric pressure ($x_5$), intake temperature ($x_6$), and engine cooling water temperature TW($x_7$). In the functional block E, the EGR valve target opening degree SAO (=SA·KKSA) is feedback controlled so that the estimated value "y" of the target EGR rate RAO matches the target EGR rate RAO.

Figure 19:
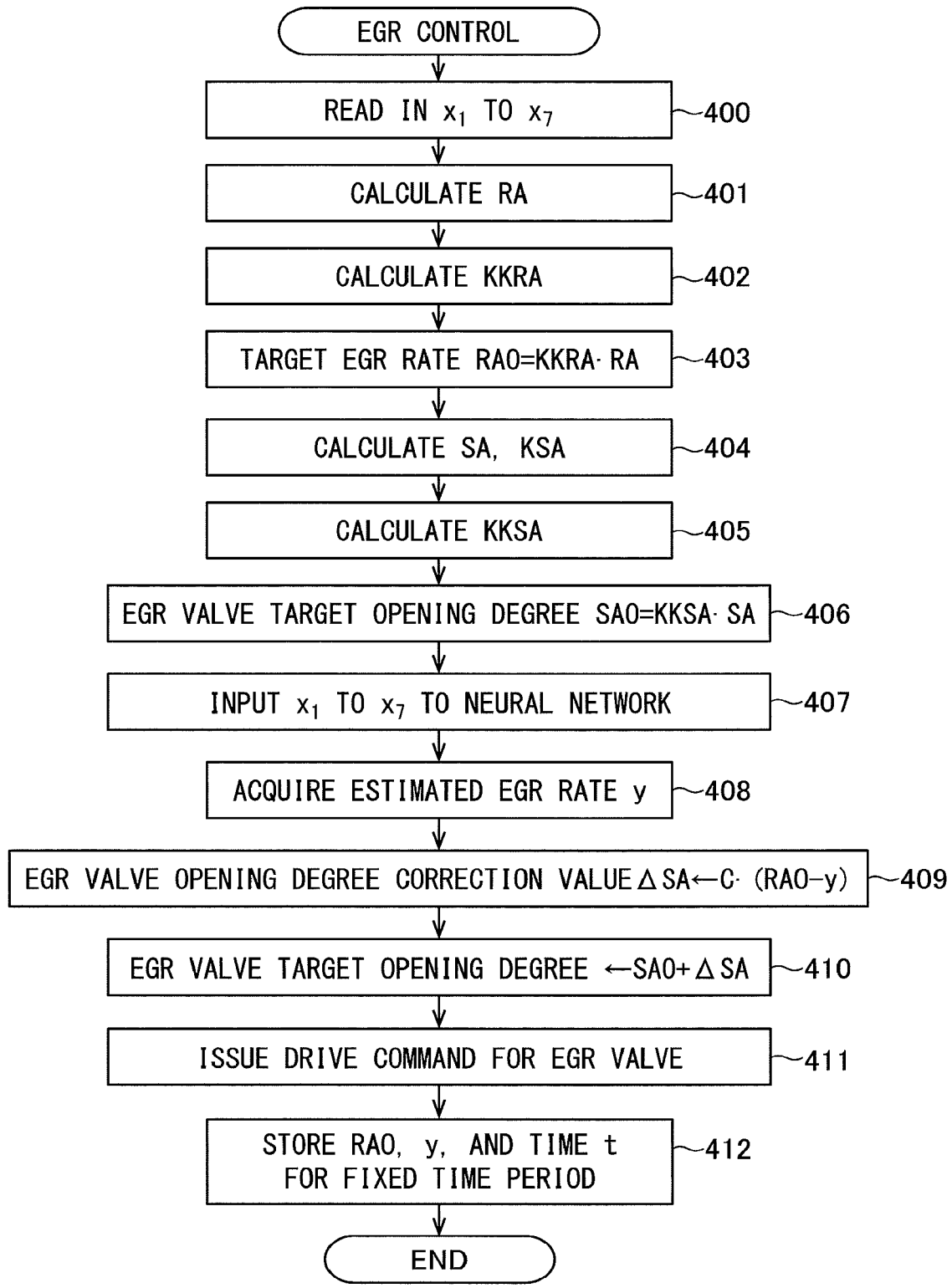
FIG. 19 is a flow chart for execution of EGR control.

FIG. 19 shows an EGR control routine performed while a commercially available vehicle is being driven. This EGR control routine is performed by interruption every fixed time period. Referring to FIG. 19, first, at step 400, the input value $x_1$ expressing the engine load L, the input value $x_2$ expressing the engine speed NE, the input value $x_3$ expressing the intake pressure, the input value $x_4$ expressing the amount of intake air, the input value $x_5$ expressing the atmospheric pressure PA, the input value $x_6$ expressing the intake temperature MT, and the input value $x_7$ expressing the engine cooling water temperature TW are read in. Next, at step 401, the basic EGR rate RA is calculated from the map shown in FIG. 3B. Next, at step 402, the correction value KKRA (=KA·KB·KC) is calculated from the correction value KA, correction value KB, and correction value KC shown in FIG. 7. Next, at step 403, the target EGR rate RAO (=KKRA·RA) is calculated.

Next, at step 404, the EGR valve target opening degree SA is calculated from the map shown in FIG. 4 and the correction value KSA is calculated from the map shown in FIG. 8. Next, at step 405, the correction value KKSA for the EGR valve target opening degree SAO (=KKRA·KSA) is calculated. Next, at step 406, the EGR valve target opening degree SAO (=KKSA·SA) is calculated. Next, at step 407, the input value $x_1$ expressing the engine load L, the input value $x_2$ expressing the engine speed NE, the input value $x_3$ expressing the intake pressure, the input value $x_4$ expressing the amount of intake air, the input value $x_5$ expressing the atmospheric pressure PA, the input value $x_6$ expressing the intake temperature MT, and the input value $x_7$ expressing the engine cooling water temperature TW are input to the nodes of the input layer of the neural network 50. At this time, the estimated value "y" of the target EGR rate RAO is output from the output layer of the neural network 50. As a result, the estimated value "y" of the target EGR rate RAO is acquired as described at step 408.

Next, at step 409, the value of the difference between the estimated value "y" of the target EGR rate RAO and the target EGR rate RAO multiplied with a constant C is made the correction value ΔSA of the EGR valve target opening degree SA. Next, at step 410, this correction value ΔSA is added to the EGR valve target opening degree SAO calculated at step 406 so as to calculate the final EGR valve target opening degree SAO+ΔSA. Next, at step 411, a drive instruction of the EGR valve 14 is issued so that the opening degree of the EGR valve 14 becomes this final target opening degree SAO+ΔSA. That is, at step 409 to step 411, the opening degree of the EGR valve 14 is feedback controlled so that the estimated value "y" of the target EGR rate RAO matches the target EGR rate RAO. Note that, FIG. 19 shows a simple example of feedback control using only proportional terms, but as this feedback control, PID control and various other feedback control can be used.

If the drive instruction of the EGR valve 14 is issued, the routine proceeds to step 412 where storage processing is performed for storing the target EGR rate RAO, the estimated value "y" of the target EGR rate RAO, and the time "t", at which the estimated value "y" of the target EGR rate RAO was acquired in the memory 32 of the electronic control unit 30, for a fixed time period. This storage processing is for detecting an abnormality of the exhaust gas recirculation system, and these acquired data is erased after the fixed time period. Next, the method of detection of an abnormality of the exhaust gas recirculation system performed during vehicle operation using these acquired data will be explained with reference to FIG. 20A to FIG. 26.

Figure 20A:
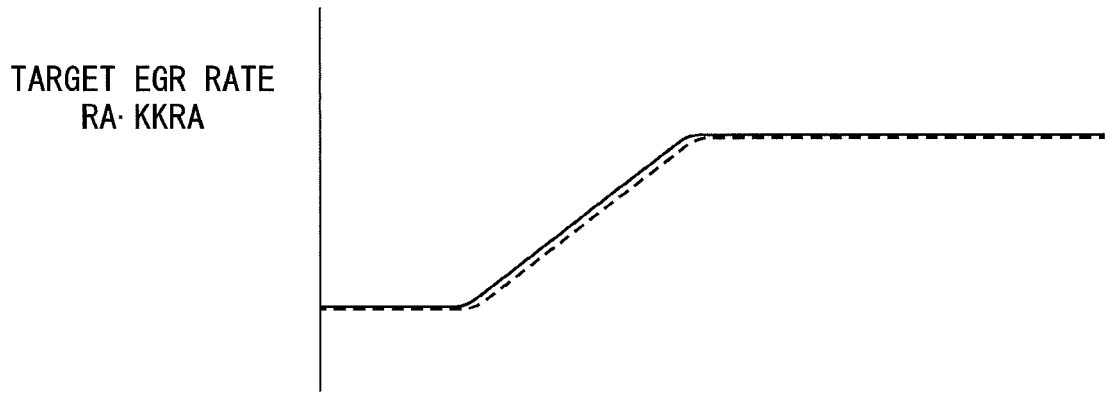
FIG. 20A, FIG. 20B, and FIG. 20C are views showing changes in the target EGR rate and estimated values of the target EGR rate.
Figure 20B:
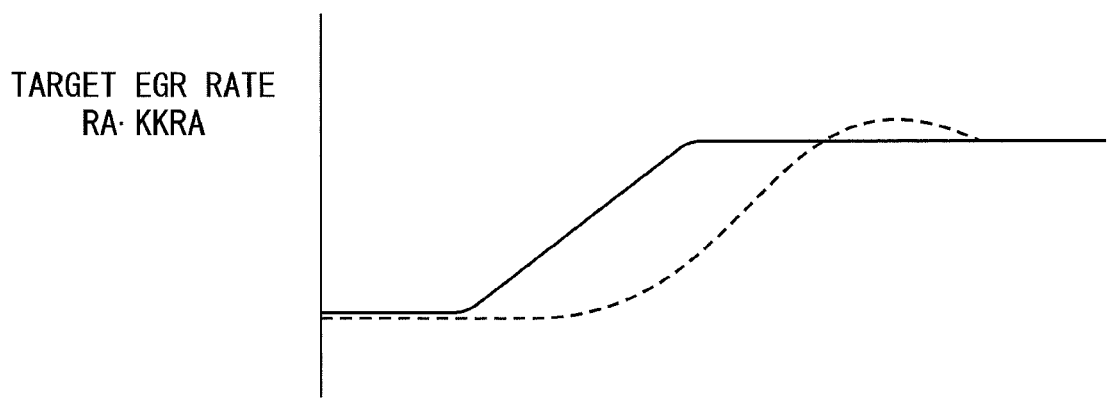
Figure 20C:
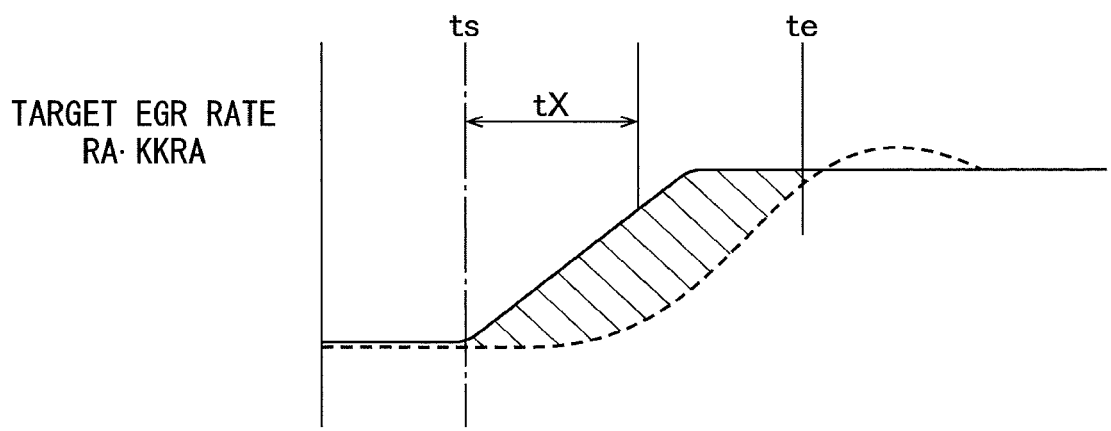

In FIG. 20A to FIG. 20C, the change in the target EGR rate RAO along with the elapse of time when the target EGR rate RAO rises during vehicle operation is shown by the solid line while the change in the estimated value "y" of the target EGR rate RAO along with the elapse of time at this time is shown by the broken line. FIG. 20A shows the time when the exhaust gas recirculation system is normal. At this time, even if the target EGR rate RAO changes, the estimated value "y" of the target EGR rate RAO changes, as shown in FIG. 20A, while tracking the target EGR rate RAO.

On the other hand, FIG. 20B shows the case where a response delay occurs in the EGR valve 14. That is, if the target EGR rate RAO increases, to increase the EGR rate, the final EGR valve target opening degree SAO+ΔSA increases. As a result, the EGR valve 14 is sent a drive command for increasing the opening degree of the EGR valve 14. However, if a response delays occurs in the EGR valve 14, even if the EGR valve 14 is issued a drive command for increasing the opening degree of the EGR valve 14, the opening degree of the EGR valve 14 will not increase. Therefore, as shown in FIG. 20B by the broken line, the estimated value "y" of the target EGR rate RAO expressing a change in the actual EGR rate will not rise that much.

On the other hand, in the embodiment according to the present invention, feedback control is performed for the opening degree of the EGR valve 14, so if the difference between the target EGR rate RAO and the estimated value "y" of the target EGR rate RAO becomes large, the final EGR valve target opening degree SAO+ΔSA is made to greatly increase. As a result, the estimated value "y" of the target EGR rate RAO expressing the change in the actual EGR rate, as shown in FIG. 20B by the broken line, gradually increases. In some cases, as shown in FIG. 20B, it overshoots, then becomes the target EGR rate RAO. In this way, whether a response delay occurs in the EGR valve 14 can be understood from the EGR rate difference ΔEGR between the target EGR rate RAO when the target EGR rate RAO increases and the estimated value "y" of the target EGR rate RAO.

In this regard, when the amount of change of the target EGR rate RAO is small, the EGR rate difference ΔEGR is small Therefore, it is difficult to judge if a response delay occurs in the EGR valve 14 from the magnitude of the EGR rate difference ΔEGR. Therefore, to judge whether a response delay occurs in the EGR valve 14 from the magnitude of the EGR rate difference ΔEGR, the amount of change of the target EGR rate RAO has to be large to a certain extent. On the other hand, even when the amount of change of the target EGR rate RAO is large to a certain extent, when the target EGR rate RAO slowly rises, even if a response delay occurs in the EGR valve 14, the estimated value "y" of the target EGR rate RAO expressing the change of the actual EGR rate will change tracking the target EGR rate RAO and no large EGR rate difference ΔEGR will occur. Therefore, when the target EGR rate RAO slowly rises, it is difficult to judge whether a response delay occurs in the EGR valve 14 from the magnitude of the EGR rate difference ΔEGR.

On the other hand, when the target EGR rate RAO rises by a fast rate, if a response delay occurs in the EGR valve 14, the EGR rate difference ΔEGR will become larger and therefore it will become possible to judge if a response delay occurs in the EGR valve 14. Therefore, to judge whether a response delay occurs in the EGR valve 14 from the magnitude of the EGR rate difference ΔEGR, the amount of change of the target EGR rate RAO has to be large enough to a certain extent and the rate of rise of the target EGR rate RAO has to be fast. Therefore, in the embodiment according to the present invention, when the rate of rise of the target EGR rate RAO has been maintained in a predetermined range of rate of rise for a fixed time period shown by tX in FIG. 20C, whether a response delay occurs in the EGR valve 14 is judged from the magnitude of the EGR rate difference ΔEGR.

In this regard, if the response delay of the EGR valve 14 becomes larger, at FIG. 20C, the area of the hatching region between the target EGR rate RAO and the estimated value "y" of the target EGR rate RAO increases. Therefore, it becomes possible to judge if a response delay occurs in the EGR valve 14 from the area of this hatching region. Therefore, in the embodiment according to the present invention, the sum value of the EGR rate difference ΔEGR from the time is when the target EGR rate RAO starts to rise to the time to when the EGR rate difference ΔEGR between the target EGR rate RAO and the estimated value "y" of the target EGR rate RAO becomes a fixed value or less is found, and when the sum value of the EGR rate difference ΔEGR is a predetermined threshold value or more, it is judged that a response delay occurs in the EGR valve 14.

Figure 21:
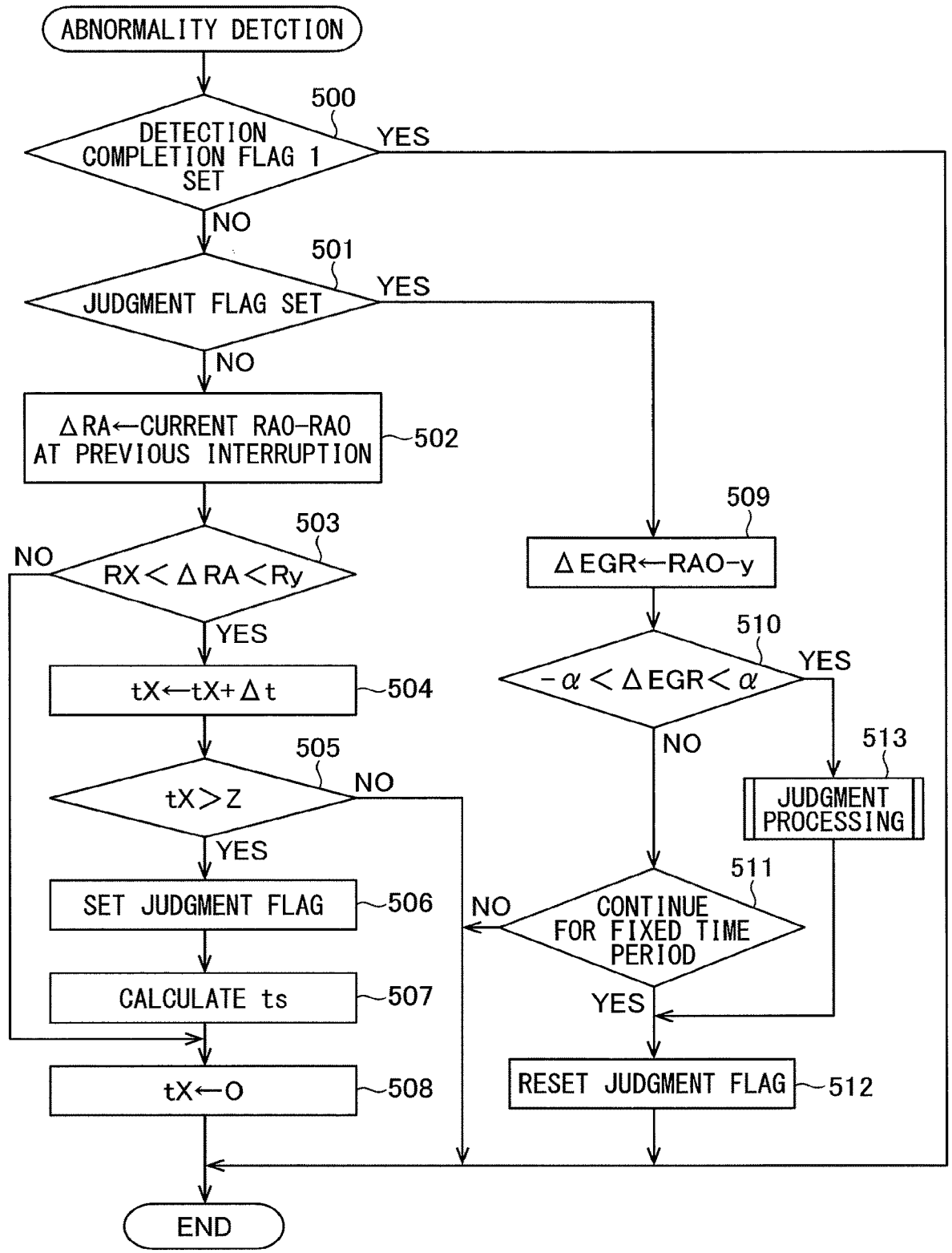
FIG. 21 is a flow chart for detecting an abnormality.

FIG. 21 shows the routine for detecting a response delay in the EGR valve 14. This routine is performed by interruption every fixed time period Δt. Referring to FIG. 21, first, at step 500, it is judged if a detection completion flag 1 showing that any response delay of the EGR valve 14 has finished being detected is set. When the detection completion flag 1 is not set, the routine proceeds to step 501 where it is judged if a judgment flag showing that an abnormality of response delay of the EGR valve 14 should be judged is set. When the judgment flag is not set, the routine proceeds to step 502 where the difference between the current target EGR rate RAO and the target EGR rate RAO at the time of the previous interruption, that is, the rate of rise ΔRA of the target EGR rate RAO, is calculated.

Next, at step 503, it is judged if the rate of rise ΔRA of the target EGR rate RAO is between a preset lower limit rate RX and upper limit rate RY. When the rate of rise ΔRA is between the lower limit rate RX and the upper limit rate RY, the routine proceeds to step 504 where an interrupt time interval Δt is added to the elapsed time tX shown in FIG. 20C. Therefore, this elapsed time tX expresses the elapsed time from when the target EGR rate RAO starts to rise. Next, at step 505, it is judged if the elapsed time tX exceeds a set time Z. When the elapsed time tX does not exceed the set time Z, the processing cycle is ended.

As opposed to this, when the elapsed time tX exceeds the set time Z, the routine proceeds to step 506 where the judgment flag is set. Next, at step 507, the time of start of rise is of the target EGR rate RAO shown in FIG. 20C is calculated from the elapsed time tX. Next, at step 508, the elapsed time tX is cleared. On the other hand, when at step 503 it is judged that the rate of rise ΔRA is not between the lower limit rate RX and the upper limit rate RY, the routine jumps to step 508. If the judgment flag is set, at the next processing cycle, the routine proceeds from step 501 to step 509.

At step 509, the EGR rate difference ΔEGR between the target EGR rate RAO and the estimated value "y" of the target EGR rate RAO is calculated. Next, at step 510, it is judged if the EGR rate difference ΔEGR is between −α and α (α is a preset small constant value). When the EGR rate difference ΔEGR is not between −α and α, the routine proceeds to step 511 where it is judged if the state of the EGR rate difference ΔEGR not being between −α and α has continued for a fixed time or more. Both if there is no response delay in the EGR valve 14 and if there is a response delay in the EGR valve 14, after the elapsed of the fixed time, the EGR rate difference ΔEGR becomes between −α and α, so when it is judged that the state of the EGR rate difference ΔEGR not being between −α and α has continued for the fixed time or more, it may be considered that some other abnormality occurs. Therefore, in this case, the routine proceeds to step 512 where the judgment flag is reset.

Figure 22:
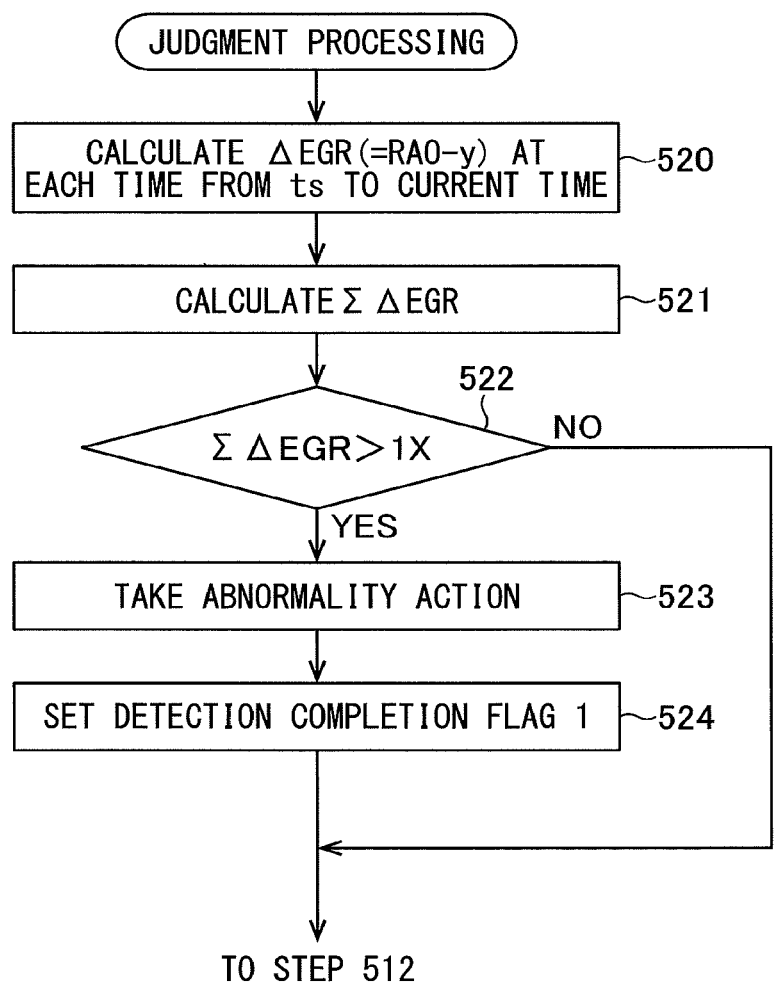
FIG. 22 is a flow chart for execution of judgment processing.

On the other hand, when at step 510 it is judged that the EGR rate difference ΔEGR is between −α and α, the routine proceeds to step 513 where processing for judgment is performed for judging if an abnormality of response delay occurs in the EGR valve 14. This processing for judgment is shown in FIG. 22. Referring to FIG. 22, at step 520, based on the target EGR rate RAO and the estimated value "y" of the target EGR rate RAO at each time "t" stored in the memory 32 of the electronic control unit 30, the EGR rate difference ΔEGR between the target EGR rate RAO and the estimated value "y" of the target EGR rate RAO at each time from the time of start of rise ts of the target EGR rate RAO to the current time is calculated. This current time corresponds to te in the case shown in FIG. 20C.

Next, at step 521, the sum value ΣΔEGR of the EGR rate difference ΔEGR at each time from the time of start of rise ts of the target EGR rate RAO to the current time is calculated. Next, at step 522, it is judged if the sum value ΣΔEGR is larger than a preset threshold value IX. When the sum value ΣΔEGR is smaller than the preset threshold value IX, the routine proceeds to step 512 of FIG. 21 where the judgment flag is reset. As opposed to this, when the sum value ΣΔEGR is larger than the preset threshold value IX, the routine proceeds to step 523 where an abnormality action is taken. As one example of this abnormality action, for example, a warning light is turned on. Next, at step 524, the detection completion flag 1 is set.

Note that, up to here, the example of judging whether an abnormality of response delay of the EGR valve 14 occurs from the EGR rate difference ΔEGR when the target EGR rate RAO rises was explained, but it is also possible to judge whether an abnormality of response delay of the EGR valve 14 occurs from the EGR rate difference ΔEGR by a similar method even when the target EGR rate RAO falls That is, both when the target EGR rate RAO rises and when the target EGR rate RAO falls, when there is a response delay in the EGR valve 14, the EGR rate difference ΔEGR between the target EGR rate RAO and the estimated value "y" of the target EGR rate RAO increases.

Therefore, in the embodiment according to the present invention, at the time of engine operation, when the target EGR rate changes, if the difference between the estimated value of the target EGR rate and the target EGR rate increases, it is judged that a response delay occurs in the EGR valve 14. Note that, in this case, in the embodiment according to the present invention, at the time of engine operation, when the target EGR rate changes, the integrated value of the difference between the estimated value of the target EGR rate and the target EGR rate is calculated and it is judged that a response delay occurs in the EGR valve when the calculated integrated value is larger than a preset threshold value.

Figure 23A:
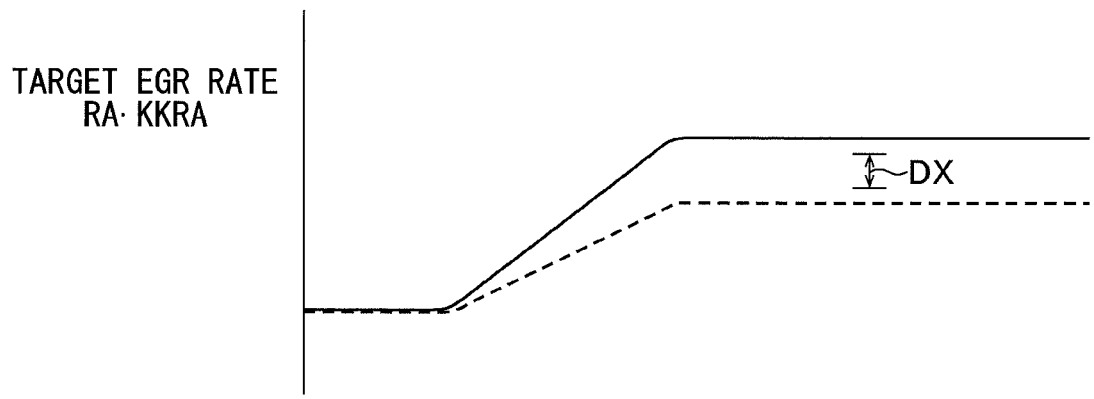
FIG. 23A, FIG. 23B, and FIG. 23C are views showing changes in the target EGR rate and the estimated value of the target EGR rate etc.
Figure 23B:
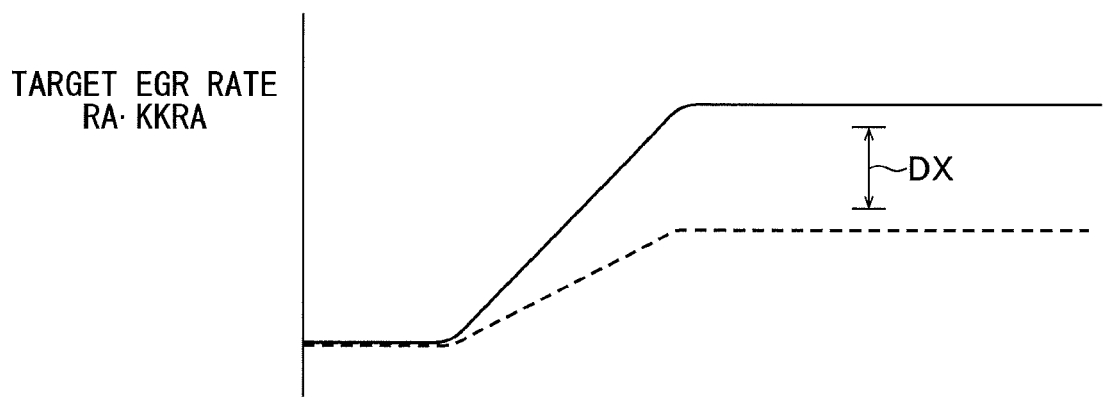

On the other hand, in FIG. 23A and FIG. 23B, the change along with the elapse of time of the target EGR rate RAO in the case where the inside of the EGR valve 14 or the EGR passage 13 is clogged and the target EGR rate RAO rises is shown by the solid line and the change along with the elapse of time of the estimated value "y" of the target EGR rate RAO at this time is shown by the broken line. Note that, FIG. 23B shows the case where the target EGR rate RAO greatly increases compared with FIG. 23A.

Now then, if the target EGR rate RAO increases, to increase the EGR rate, the final EGR valve target opening degree SAO+ΔSA is increased and as a result the opening degree of the EGR valve 14 is made to increase. However, if the inside of the EGR valve 14 or the EGR passage 13 is clogged, even if the opening degree of the EGR valve 14 increases, the amount of recirculated exhaust gas flowing from the EGR passage 13 into the surge tank 6 does not sufficiently increase, so the estimated value "y" of the target EGR rate RAO does not easily rise.

On the other hand, in the embodiment according to the present invention, feedback control is performed on the opening degree of the EGR valve 14, so if the difference between the target EGR rate RAO and the estimated value "y" of the target EGR rate RAO becomes greater, the final EGR valve target opening degree SAO+ΔSA is made to greatly increase. However, even if the final EGR valve target opening degree SAO+ΔSA is made to greatly increase, if the amount of clogging inside the EGR valve 14 or the EGR passage 13 is great, the estimated value "y" of the target EGR rate RAO expressing the actual change in the EGR rate, as shown by the broken lines in FIG. 23A and FIG. 23B, will not increase to the target EGR rate RAO. As a result, the EGR valve 14 becomes a full open state. Therefore, whether the inside of the EGR valve 14 or the EGR passage 13 is clogged is learned from the EGR rate difference ΔEGR between the target EGR rate RAO and the estimated value "y" of the target EGR rate RAO when the target EGR rate RAO increases and is stabilized.

Figure 23C:
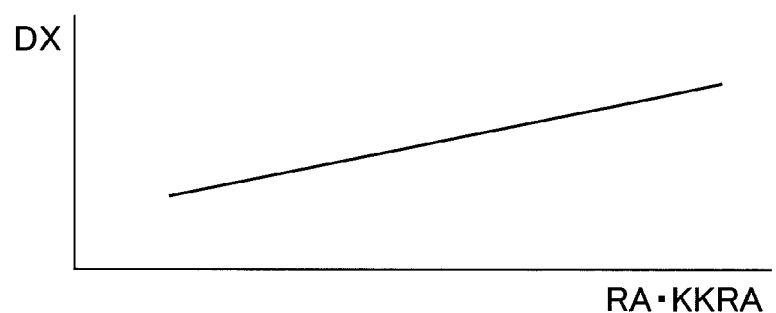

Note that, if the amount of clogging at the inside of the EGR valve 14 or the EGR passage 13 is great, as will be understood from FIG. 23A and FIG. 23B, the estimated value "y" of the target EGR rate RAO which expresses the actual change in the EGR rate will only rise by a certain extent without regard as to the magnitude of the target EGR rate RAO after its rise. Therefore, after the target EGR rate RAO rises, the EGR rate difference ΔEGR between the target EGR rate RAO and the estimated value "y" of the target EGR rate RAO will become larger the higher the target EGR rate RAO. Therefore, the threshold value DX with respect to the EGR rate difference ΔEGR for judging if the inside of the EGR valve 14 or the EGR passage 13 is clogged, as shown in FIG. 23C, is made larger the higher the target EGR rate RAO.

Figure 24:
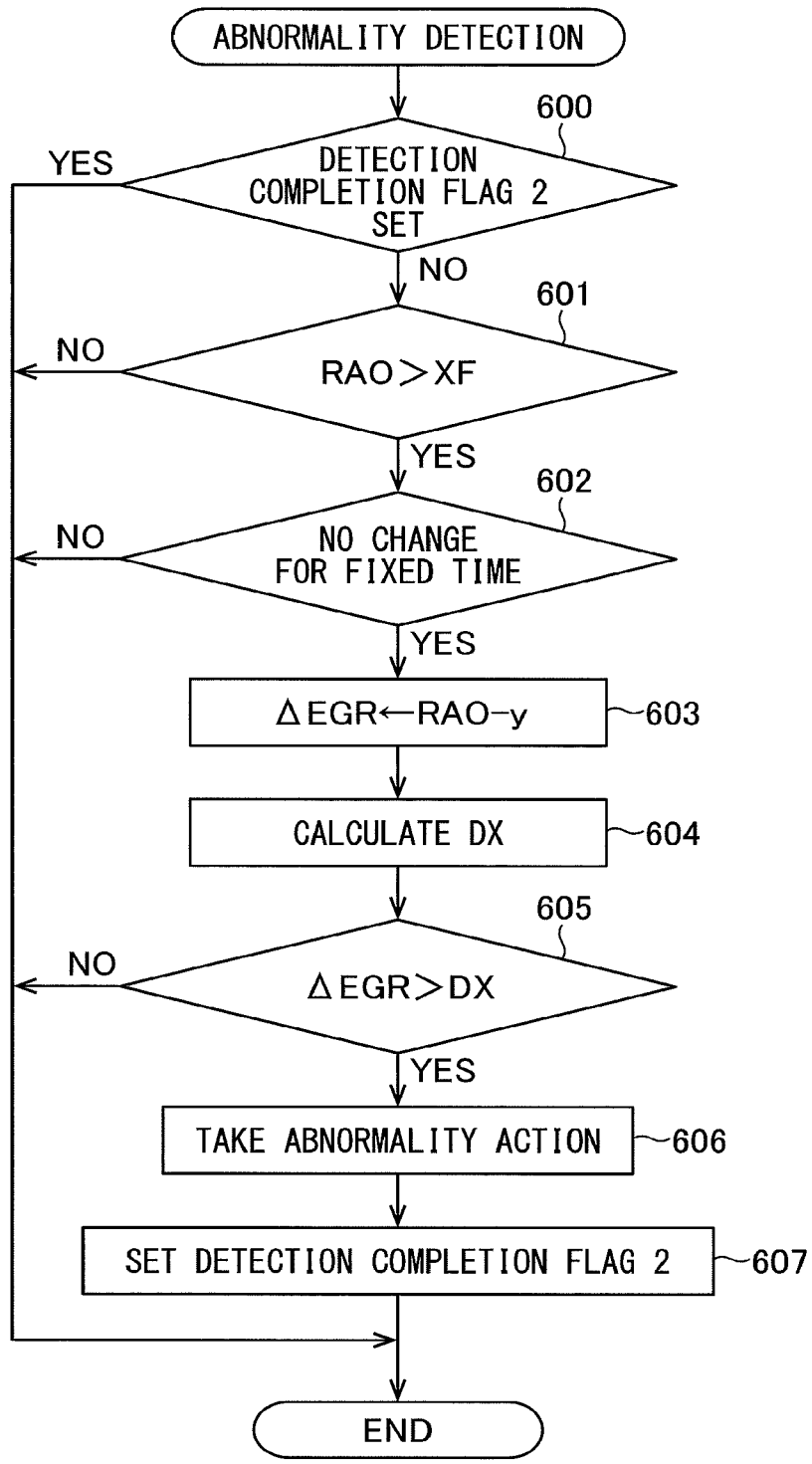
FIG. 24 is a flow chart for abnormality detection.

FIG. 24 shows a routine for detection of an abnormality of clogging where the inside of the EGR valve 14 or the EGR passage 13 is clogged. This routine is performed by interruption every fixed time period. Referring to FIG. 24, first, at step 600, it is judged if a detection completion flag 2 showing that detection of an abnormality of clogging in the inside of the EGR valve 14 or the EGR passage 13 has been completed is set. When the detection completion flag 2 is not set, the routine proceeds to step 601, where it is judged if the target EGR rate RAO is the set value XF or more. That is, if the target EGR rate RAO is not large enough to a certain extent, no EGR rate difference ΔEGR occurs, so at step 601, it is judged if the target EGR rate RAO is the set value XF or more.

Next, at step 602, it is judged if the target EGR rate RAO has not changed for a fixed time or more, that is, if the target EGR rate RAO is stable. When the target EGR rate RAO has not changed for the fixed time or more, that is, when the target EGR rate RAO is stable, the routine proceeds to step 603, where the EGR rate difference ΔEGR between the target EGR rate RAO and the estimated value "y" of the target EGR rate RAO is calculated. Next, at step 604, the threshold value DX corresponding to the target EGR rate RAO is calculated from FIG. 23C. Next, at step 605, it is judged if the EGR rate difference ΔEGR is greater than the threshold value DX. When the EGR rate difference ΔEGR is larger than the threshold value DX, the routine proceeds to step 606 where an abnormality action is taken. As one example of this abnormality action, for example, a warning light is turned on. Next, at step 607, the detection completion flag 2 is set.

That is, in this example, at the time of engine operation, when the target EGR rate is stable, if the estimated value of the target EGR rate is lower than the target EGR rate and the difference between the estimated value of the target EGR rate and the target EGR rate is larger than the threshold value, it is judged that the inside of the EGR valve or the EGR passage is clogged.

Figure 25A:
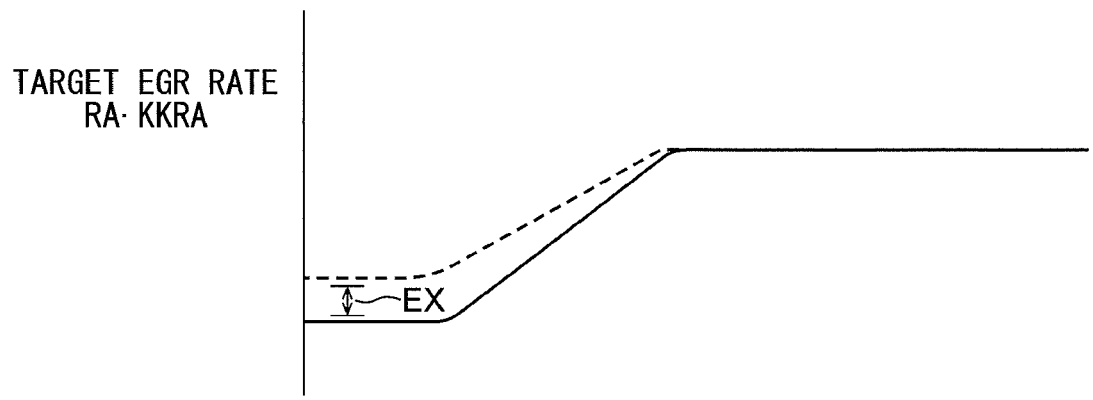
FIG. 25A, FIG. 25B, and FIG. 25C are views showing changes in the target EGR rate and the estimated value of the target EGR rate etc.
Figure 25B:
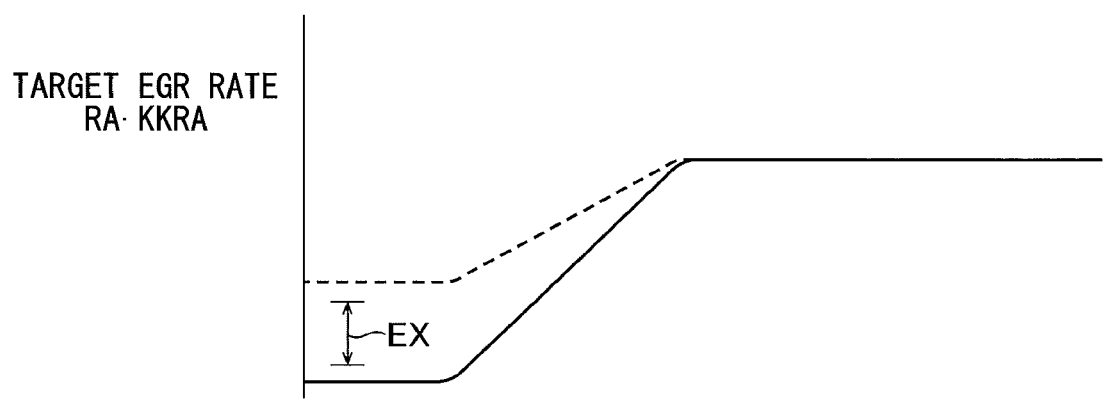

On the other hand, in FIG. 25A and FIG. 25B, when the EGR valve 14 is malfunctioning in closing by not completely closing, the change along with the elapse of time in the target EGR rate RAO when the target EGR rate RAO rises is shown by the solid line and the change along with the elapse of time in the estimated value "y" of the target EGR rate RAO is shown by the broken lines. Note that, FIG. 25B shows the case where the target EGR rate RAO before the rise is low compared with FIG. 25A.

Now then, as shown in FIG. 25A and FIG. 25B by the target EGR rate RAO before the rise, if the target EGR rate RAO is low, the final EGR valve target opening degree SAO+ΔSA is lowered so as to lower the EGR rate. As a result, the opening degree of the EGR valve 14 is lowered. However, if a closing malfunction arises where the EGR valve 14 does not completely close, even if a closing command is sent to the EGR valve 14, the EGR valve 14 will only close to a certain opening degree. The same is true when feedback control is performed for the opening degree of the EGR valve 14. Therefore, if the EGR valve 14 malfunctions in closing, as shown in FIG. 25A and FIG. 25B by the broken line, the estimated value "y" of the target EGR rate RAO expressing the actual change of the EGR rate will only fall to a certain extent. Therefore, whether or not the EGR valve 14 malfunctions in closing can be learned from the EGR rate difference ΔEGR between the target EGR rate RAO and the estimated value "y" of the target EGR rate RAO when the target EGR rate RAO is stable.

Figure 25C:
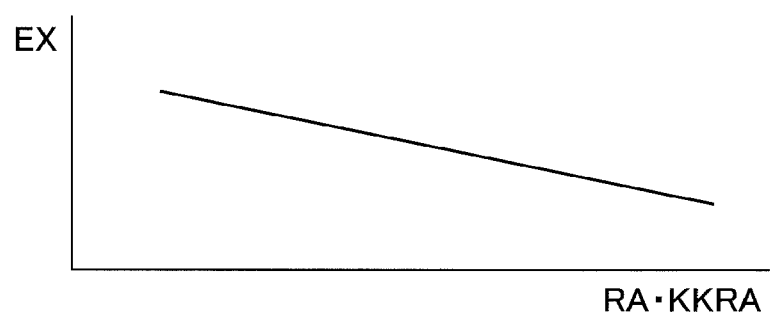

Note that, when the EGR valve 14 malfunctions in closing, as shown in FIG. 25A and FIG. 25B by the target EGR rate RAO and the estimated value "y" of the target EGR rate RAO before the rise, the estimated value "y" of the target EGR rate RAO expressing the actual change of the EGR rate becomes the similar value without regard as to the magnitude of the target EGR rate RAO. Therefore, the EGR rate difference ΔEGR between the target EGR rate RAO and the estimated value "y" of the target EGR rate RAO becomes larger the lower the target EGR rate RAO. Therefore, a threshold value EX for the EGR rate difference ΔEGR for judging if the EGR valve 14 malfunctions in closing, as shown in FIG. 25C, is made larger the lower the target EGR rate RAO.

Figure 26:
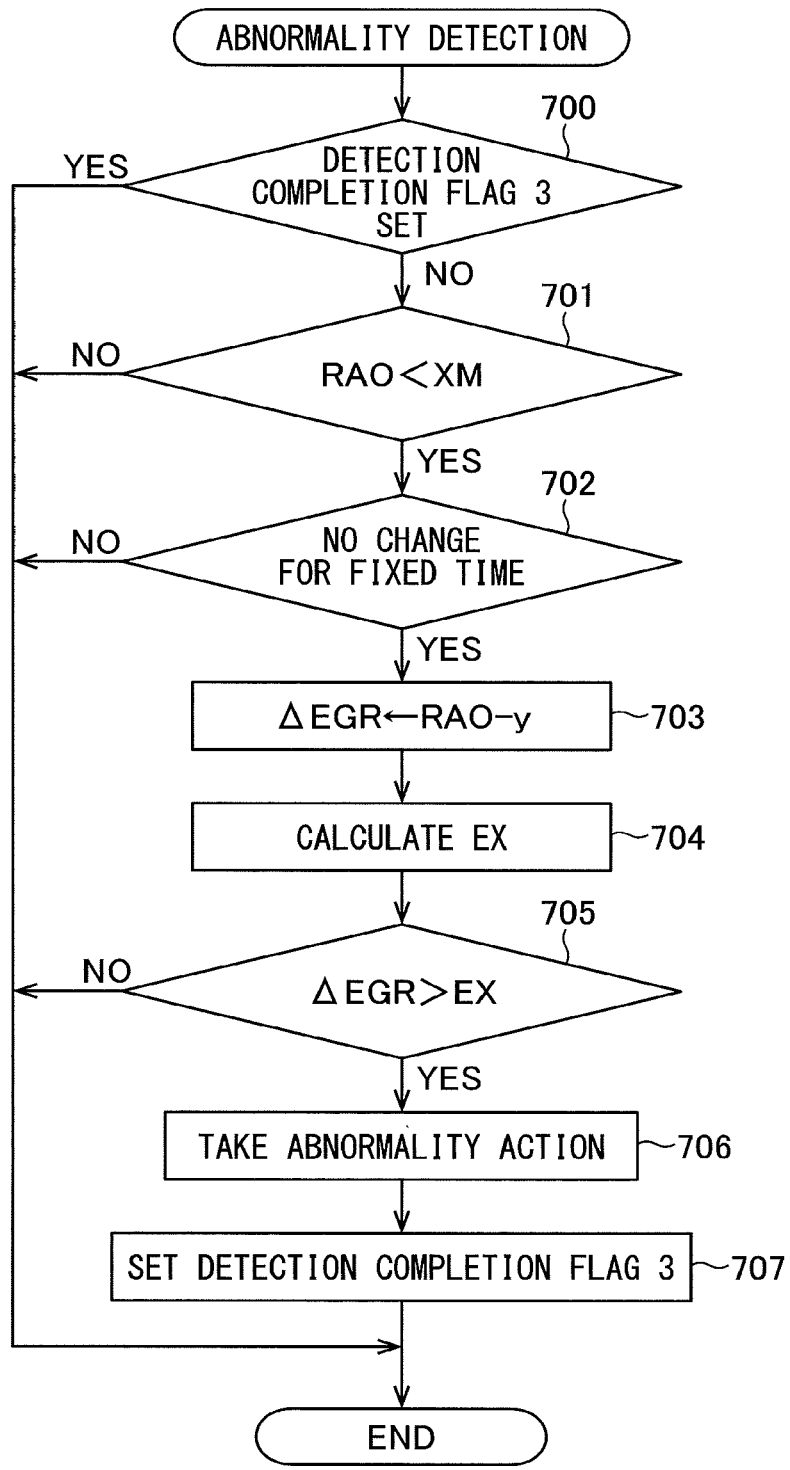
FIG. 26 is a flow chart for abnormality detection.

FIG. 26 shows a routine for detection of an abnormality of valve closing where the EGR valve 14 malfunctions in closing. This routine is performed by interruption every fixed time period. Referring to FIG. 26, first, at step 700, it is judged if a detection completion flag 3 showing that any abnormality of valve closing of the EGR valve 14 has finished being detected is set. When the detection completion flag 3 is not set, the routine proceeds to step 701 where it is judged if the target EGR rate RAO is a set value XM or less. That is, if the target EGR rate RAO is not low to a certain extent, no EGR rate difference ΔEGR is caused, so at step 701, it is judged if the target EGR rate RAO is the set value XF or less.

Next, at step 702, it is judged whether the target EGR rate RAO has not changed for a fixed time or more, that is, if the target EGR rate RAO is stable. When the target EGR rate RAO has not changed for the fixed time or more, that is, when the target EGR rate RAO is stable, the routine proceeds to step 703, where the EGR rate difference ΔEGR of the target EGR rate RAO and the estimated value "y" of the target EGR rate RAO is calculated. Next, at step 704, the threshold value EX corresponding to the target EGR rate RAO is calculated from FIG. 25C. Next, at step 705, it is judged if the EGR rate difference ΔEGR is greater than the threshold value EX. When the EGR rate difference ΔEGR is greater than the threshold value EX, the routine proceeds to step 706 where an abnormality action is taken. As one example of this abnormality action, for example, a warning light is turned on. Next, at step 707, the detection completion flag 3 is set.

That is, in this example, at the time of engine operation, when the target EGR rate is stable, if the estimated value of the target EGR rate is higher than the target EGR rate and the difference between the estimated value of the target EGR rate and the target EGR rate is larger than the threshold value, it is judged that the EGR valve malfunctions in closing.

In this regard, as explained above, in the embodiment according to the present invention, at the time of engine operation, the opening degree of the EGR valve is feedback controlled so that the EGR rate becomes the target EGR rate. In this case, even without feedback control of the opening degree of the EGR valve, it is possible to detect an abnormality of the exhaust gas recirculation system based on the difference between the estimated value of the target EGR rate and the target EGR rate. Of course, in this case, by feedback control of the opening degree of the EGR valve, the precision of detection of an abnormality of the exhaust gas recirculation system becomes higher.

Considering the fact that it is possible to detect an abnormality of the exhaust gas recirculation system based on the difference between the estimated value of the target EGR rate and the target EGR rate even without feedback control of the EGR valve opening degree, in the present invention, there is provided an abnormality detection system of an exhaust gas recirculation system comprising an EGR passage 13 for making exhaust gas discharged from an engine recirculate to an intake passage downstream of a throttle value 12, and an EGR valve 14 arranged in the EGR passage 13, a target EGR rate being stored in advance as a function of at least an engine load and an engine speed, an opening degree of the EGR valve 14 being controlled so that an EGR rate becomes the target EGR rate. A learned neural network stored using at least four parameters of an engine load, an engine speed, an intake pressure inside the intake passage downstream of the throttle valve 12, and an amount of intake air fed into the engine as input parameters of the neural network and using the target EGR rate as training data is stored, and the target EGR rate is estimated from the above mentioned input parameters using the learned neural network at the time of an engine operation. An abnormality of the exhaust gas recirculation system is detected based on the difference between an estimated value of the target EGR rate and the target EGR rate.

In this case, in the embodiment according to the present invention, the target EGR rate is stored in advance as a function of the engine load, engine speed, atmospheric pressure, intake temperature, and engine cooling water temperature, and the learned neural network in weights using seven parameters of the engine load, engine speed, intake pressure inside the intake passage downstream of the throttle valve 12, amount of intake air fed into the engine, atmospheric pressure, intake temperature, and engine cooling water temperature as input parameters of the neural network and using the target EGR rate as training data is stored. At the time of engine operation, the learned neural network is used to estimate the target EGR rate from the seven parameters and an abnormality of the exhaust gas recirculation system is detected based on the difference between the estimated value of the target EGR rate and the target EGR rate.

The invention claimed is:

1. An abnormality detection system of an exhaust gas recirculation system comprising
    an EGR passage for making exhaust gas discharged from an engine recirculate to an intake passage downstream of a throttle value, and
    an EGR valve arranged in the EGR passage, a target EGR rate being stored in advance as a function of at least an engine load and an engine speed, an opening degree of the EGR valve being controlled so that an EGR rate becomes the target EGR rate, wherein,
    a learned neural network stored using at least four parameters of an engine load, an engine speed, an intake pressure inside the intake passage downstream of the throttle valve, and an amount of intake air fed into the engine as input parameters of the neural network and using the target EGR rate as training data is stored
    the target EGR rate is estimated from said input parameters using the learned neural network at the time of an engine operation, and
    an abnormality of the exhaust gas recirculation system is detected based on the difference between an estimated value of the target EGR rate and the target EGR rate.

2. The abnormality detection system of an exhaust gas recirculation system according to claim 1, wherein at the time of engine operation, the opening degree of the EGR valve is feedback controlled so that the EGR rate becomes the target EGR rate.

3. The abnormality detection system of an exhaust gas recirculation system according to claim 1, wherein the target EGR rate is stored in advance as a function of the engine load, engine speed, atmospheric pressure, intake temperature, and engine cooling water temperature,
    the learned neural network in weights using seven parameters of the engine load, engine speed, intake pressure inside the intake passage downstream of the throttle valve, amount of intake air fed into the engine, atmospheric pressure, intake temperature, and engine cooling water temperature as input parameters of the neural network and using the target EGR rate as training data is stored,
    at the time of engine operation, the learned neural network is used to estimate the target EGR rate from the seven parameters and
    an abnormality of the exhaust gas recirculation system is detected based on the difference between the estimated value of the target EGR rate and the target EGR rate.

4. The abnormality detection system of an exhaust gas recirculation system according to claim 1, wherein at the time of engine operation, when the target EGR rate changes if the difference between the estimated value of the target EGR rate and the target EGR rate increases, it is judged that a response delay of the EGR valve occurs.

5. The abnormality detection system of an exhaust gas recirculation system according to claim 4, wherein at the time of engine operation when the target EGR rate changes, an integrated value of the difference between the estimated value of the target EGR rate and the target EGR rate is calculated and it is judged that a response delay of the EGR valve occurs when the calculated integrated value is larger than a preset threshold value.

6. The abnormality detection system of an exhaust gas recirculation system according to claim 1, wherein at the time of engine operation, when the target EGR rate is stable, if the estimated value of the target EGR rate is lower than the target EGR rate and the difference between the estimated value of the target EGR rate and the target EGR rate is larger than a preset threshold value it is judged that the EGR passage is clogged.

7. The abnormality detection system of an exhaust gas recirculation system according to claim 1, wherein at the time of engine operation, when the target EGR rate is stable if the estimated value of the target EGR rate is higher than the target EGR rate and the difference between the estimated value of the target EGR rate and the target EGR rate is larger than a preset threshold value it is judged that the EGR valve malfunctions in closing.

* * * * *